(12) United States Patent
Li et al.

(10) Patent No.: US 12,010,690 B2
(45) Date of Patent: Jun. 11, 2024

(54) COMMUNICATION METHOD, COMMUNICATIONS APPARATUS, AND STORAGE MEDIUM

(71) Applicant: HUAWEI TECHNOLOGIES CO., LTD., Shenzhen (CN)

(72) Inventors: Shengyu Li, Beijing (CN); Lei Guan, Beijing (CN); Yuan Li, Bonn (DE)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 424 days.

(21) Appl. No.: 17/370,423

(22) Filed: Jul. 8, 2021

(65) Prior Publication Data

US 2021/0337536 A1    Oct. 28, 2021

Related U.S. Application Data

(63) Continuation of application No. PCT/CN2019/127702, filed on Dec. 24, 2019.

(30) Foreign Application Priority Data

Jan. 10, 2019 (CN) .......................... 201910023940.5

(51) Int. Cl.
H04W 72/21 (2023.01)
H04L 5/00 (2006.01)
H04W 72/23 (2023.01)

(52) U.S. Cl.
CPC .......... H04W 72/21 (2023.01); H04L 5/0044 (2013.01); H04W 72/23 (2023.01)

(58) Field of Classification Search
CPC .......................... H04L 5/0053; H04L 5/0057
See application file for complete search history.

(56) References Cited

U.S. PATENT DOCUMENTS 10,129,906 B2 * 11/2018 Rahman ............... H04B 7/0602
2013/0121299 A1   5/2013 Kim et al.
(Continued)

FOREIGN PATENT DOCUMENTS

CN   102821472 A   12/2012
CN   103348621 A   10/2013
(Continued)

OTHER PUBLICATIONS

Samsung. "UCI Transmission for Low Cost UEs." 3GPP TSG RAN WG1 #82. Beijing, China. Aug. 24-28, 2015. R1-154103. 3 pages.
(Continued)

*Primary Examiner* — Hashim S Bhatti
(74) *Attorney, Agent, or Firm* — Maier & Maier, PLLC

(57) ABSTRACT

A communication method, and a communications apparatus. The method includes: a terminal device determines uplink information; when the uplink information is first feedback information, the terminal device determines a first uplink control channel resource corresponding to the first feedback information, and sends the first feedback information on the first uplink control channel resource; or when the uplink information includes A-CSI, the terminal device determines a second uplink control channel resource corresponding to the uplink information, and sends the uplink information on the second uplink control channel resource, where the first uplink control channel resource is different from the second uplink control channel resource. Therefore, a network device identifies, according to the control channel resource for the received uplink information, whether the uplink information includes the A-CSI, so that the uplink information can be correctly received without times of blind detection, and receiving complexity is low.

15 Claims, 12 Drawing Sheets

(56) References Cited

U.S. PATENT DOCUMENTS

| | | | |
|---|---|---|---|
| 2013/0235756 A1 | 9/2013 | Seo et al. | |
| 2014/0204856 A1* | 7/2014 | Chen | H04L 5/0057 370/329 |
| 2014/0328422 A1 | 11/2014 | Chen et al. | |
| 2022/0094479 A1* | 3/2022 | Gao | H04L 5/0057 |

FOREIGN PATENT DOCUMENTS

| | | | |
|---|---|---|---|
| CN | 104253677 | A | 12/2014 |
| CN | 104518860 | A | 4/2015 |
| CN | 104919749 | A | 9/2015 |
| CN | 104955111 | A | 9/2015 |
| CN | 105530075 | A | 4/2016 |
| CN | 106257856 | A | 12/2016 |
| CN | 106301720 | A | 1/2017 |
| CN | 106559884 | A | 4/2017 |
| CN | 109150413 | A | 1/2019 |
| CN | 109155714 | A | 1/2019 |
| EP | 3248428 | | 11/2017 |
| EP | 3251272 | | 12/2017 |
| WO | 2016116669 | A1 | 7/2016 |
| WO | 2016122846 | A1 | 8/2016 |
| WO | 2018027908 | A1 | 2/2018 |
| WO | 2018064590 | A1 | 4/2018 |
| WO | 2018227538 | A1 | 12/2018 |
| WO | 2018228523 | A1 | 12/2018 |

OTHER PUBLICATIONS

Huawei et al. "Aperiodic CSI feedback on PUCCH in NR." 3GPP TSG RAN WG1 Ad Hoc Meeting. Vancouver, Canada. Jan. 22-26, 2018. R1-1800829. 3 pages.

Qualcomm Incorporated. "Remaining details on advanced CSI." 3GPP TSG-RAN WG1 #88. Athens, Greece. Feb. 13-17, 2017. R1-1702536. 3 pages.

"Maintenance issues of physical uplink control channel", 3GPP TSG-RAN WG1 Meeting #94, R1-1809406, Ericsson, Gothenburg, Sweden, Aug. 20-24, 2018, 16 pages.

Huawei et al: "L 1 enhancements for URLLC", 3GPP Draft; R1-1810157,Sep. 29, 2018, XP051517572, total 15 pages.

Huawei et al: "Discussion on aperiodic CSI feedback on PUCCH in NR", 3GPP Draft; R1-1804434,Apr. 15, 2018, XP051426715, total 3 pages.

* cited by examiner

COMMUNICATION METHOD, COMMUNICATIONS APPARATUS, AND STORAGE MEDIUM

CROSS-REFERENCE TO RELATED APPLICATIONS

This application is a continuation of International Patent Application No. PCT/CN2019/127702, filed on Dec. 24, 2019, which claims priority to Chinese Patent Application No. 201910023940.5, filed on Jan. 10, 2019. The disclosures of the aforementioned applications are hereby incorporated by reference in their entireties.

TECHNICAL FIELD

The embodiments relate to the wireless communications field, and in particular, to a communication method, a communications apparatus, and a storage medium.

BACKGROUND

A next generationNG mobile communications system supports an ultra-reliable low-latency communication (URLLC) service. The URLLC service has a high requirement for reliability. Therefore, a channel state information (CSI) feedback technology is quite important. Channel and interference information can be quickly obtained in time by triggering an aperiodic channel state information (A-CSI) feedback, to assist in improving subsequent data transmission quality.

To avoid additional downlink control information (DCI) overheads caused by the A-CSI feedback, a solution of feeding back A-CSI on an uplink control channel, for example, a short physical uplink control channel (short PUCCH), is proposed in the conventional technology, and DCI for scheduling downlink URLLC data is also used to trigger a terminal device to feed back the A-CSI on the uplink control channel, thereby reducing the DCI overheads.

Once the A-CSI fed back on the uplink control channel overlaps an acknowledgement (ACK)/a negative acknowledgement (NACK) also sent on an uplink control channel, the A-CSI and the ACK/NACK need to be jointly fed back. However, if the terminal device misses detecting the DCI that triggers the A-CSI, a network device and the terminal device have inconsistent understandings on uplink control information (UCI) that is jointly fed back, resulting in a receiving error.

SUMMARY

Embodiments provide a communication method, a communications apparatus, and a storage medium, to improve correctness of receiving uplink information.

According to a first aspect, an embodiment provides a communication method. The method includes: determining uplink information; and when the uplink information is first feedback information, determining a first uplink control channel resource corresponding to the first feedback information, and sending the first feedback information on the first uplink control channel resource; or when the uplink information includes A-CSI, determining a second uplink control channel resource corresponding to the uplink information, and sending the uplink information on the second uplink control channel resource, where the first uplink control channel resource is different from the second uplink control channel resource.

The method may be performed by a terminal device or a communications apparatus, for example, a chip, that can be used in the terminal device.

The first feedback information may be feedback information indicating that downlink data transmission is correctly decoded or incorrectly decoded, for example, an ACK/a NACK. Optionally, the first feedback information and the A-CSI may be respectively indicated by different DCI to be sent on overlapped time domain resources.

In a possible implementation of the first aspect, the method further includes: receiving first indication information, where the first indication information is used to indicate a first group of uplink control channel resource sets, and the first group of uplink control channel resource sets includes at least one uplink control channel resource set; and receiving second indication information, where the second indication information is used to indicate a second group of uplink control channel resource sets, and the second group of uplink control channel resource sets includes at least one uplink control channel resource set, where at least one uplink control channel resource set in the first group of uplink control channel resource sets is different from at least one uplink control channel resource set in the second group of uplink control channel resource sets. Optionally, the first indication information and the second indication information are configured by a higher layer.

In a possible implementation of the first aspect, the determining a first uplink control channel resource corresponding to the uplink information includes: determining the first uplink control channel resource based on first resource indication information; and the determining a second uplink control channel resource corresponding to the uplink information includes: determining the second uplink control channel resource based on second resource indication information, where the first resource indication information and the second resource indication information are included in two pieces of different DCI.

Optionally, the first resource indication information and the second resource indication information each may be an ACK/NACK resource indicator (ARI), or may be other indication information used to indicate a channel resource.

In a possible implementation of the first aspect, the two pieces of different DCI include first DCI and second DCI; the second resource indication information is included in the first DCI, and the first DCI corresponds to the A-CSI; and the first resource indication information is included in the second DCI, the second DCI is the $N^{th}$ piece of DCI that is received by the terminal device in a time sequence and/or based on a number of a carrier and that corresponds to the first feedback information, the first feedback information corresponds to N pieces of DCI, and N is a positive integer. Optionally, the second DCI is received after the first DCI, or the second DCI and the first DCI are received at the same time. In this implementation, different uplink control channel resources are indicated for the first feedback information and the uplink information that includes the A-CSI by different DCI, and the second DCI is the latest piece of DCI that is received by the terminal device and that corresponds to the first feedback information.

In a possible implementation of the first aspect, the method further includes: receiving third DCI after receiving the first DCI, where the third DCI is used to indicate the terminal device to send third feedback information, and a third uplink control channel resource that carries the third feedback information does not overlap the second uplink control channel resource. In other words, the terminal device does not expect to receive DCI whose corresponding feedback information overlaps the A-CSI, and the terminal device may not perform an ACK feedback/a NACK feedback on data scheduled by the DCI that is not expected to be received, or may set the feedback information to a NACK. In this way, the second DCI may be used as the latest piece of DCI received by the terminal device, and resource indication information, for example, an ARI, in the second DCI may be used to indicate, for the A-CSI, an uplink control channel resource different from that of the first feedback information.

In a possible implementation of the first aspect, the method further includes: receiving fourth DCI, where the fourth DCI is received after DCI (for example, the first DCI) that triggers the A-CSI, and the fourth DCI is used to indicate the terminal device to jointly send feedback information corresponding to the fourth DCI and an A-CSI report corresponding to the A-CSI. The terminal device is repeatedly indicated to send the A-CSI report, so that a success rate of sending the A-CSI by the terminal device can be improved, and an error that occurs when a network device receives the uplink information is further avoided. Optionally, "the fourth DCI is received after DCI that triggers the A-CSI" herein may mean that a monitoring occasion in which the fourth DCI is located is later than a monitoring occasion in which DCI that triggers the A-CSI is located. Alternatively, the fourth DCI and the DCI that triggers the A-CSI are in a same monitoring occasion, and a number of a carrier on which the fourth DCI is located is greater than a number of a carrier on which the DCI that triggers the A-CSI is located.

According to a second aspect, an embodiment provides a communication method. The method includes: determining an uplink control resource used by uplink information sent by a terminal device; when the uplink information is received on a first uplink control channel resource, determining that the uplink information is first feedback information; or when the uplink information is received on a second uplink control channel resource, determining that the uplink information includes A-CSI, where the first uplink control channel resource is different from the second uplink control channel resource; and receiving the uplink information.

The method may be performed by a network device (for example, a base station) or a communications apparatus, for example, a chip, that can be used in the network device.

In a possible implementation of the second aspect, the method further includes: sending first indication information to the terminal device, where the first indication information is used to indicate a first group of uplink control channel resource sets, and the first group of uplink control channel resource sets includes at least one uplink control channel resource set; and sending second indication information to the terminal device, where the second indication information is used to indicate a second group of uplink control channel resource sets, and the second group of uplink control channel resource sets includes at least one uplink control channel resource set, where at least one uplink control channel resource set in the first group of uplink control channel resource sets is different from at least one uplink control channel resource set in the second group of uplink control channel resource sets. Optionally, the first indication information and the second indication information are configured by a higher layer.

In a possible implementation of the second aspect, the method further includes: sending first resource indication information to the terminal device, where the first resource indication information is used to determine the first uplink control channel resource; and sending second resource indication information to the terminal device, where the second resource indication information is used to determine the second uplink control channel resource, where the first resource indication information and the second resource indication information are included in two pieces of different DCI.

In a possible implementation of the second aspect, the two pieces of different DCI include first DCI and second DCI; the second resource indication information is included in the first DCI, and the first DCI corresponds to the A-CSI; and the first resource indication information is included in the second DCI, the second DCI is the $N^{th}$ piece of DCI that is received by the terminal device in a time sequence and/or based on a number of a carrier and that corresponds to the first feedback information, the first feedback information corresponds to N pieces of DCI, and N is a positive integer.

Optionally, the second DCI is sent after the first DCI, or the second DCI and the first DCI are sent at the same time.

In a possible implementation of the second aspect, the method further includes: sending third DCI to the terminal device after sending the first DCI, where the third DCI is used to indicate the terminal devices to send third feedback information, and a third uplink control channel resource that carries the third feedback information does not overlap the second uplink control channel resource.

In a possible implementation of the second aspect, the method further includes: sending fourth DCI to the terminal device, where the fourth DCI is sent after DCI (for example, the first DCI) that indicates to send the A-CSI, and the fourth DCI is used to indicate the terminal device to jointly send feedback information corresponding to the fourth DCI and an A-CSI report corresponding to the A-CSI.

In a possible implementation of the first aspect or the second aspect, the uplink information includes the A-CSI and the first feedback information, and the sending the uplink information on the second uplink control channel resource includes: sending the A-CSI and the first feedback information on the second uplink control channel resource.

In a possible implementation of the first aspect or the second aspect, the uplink information includes the A-CSI and second feedback information, and the sending the uplink information on the second uplink control channel resource includes: sending the A-CSI and the second feedback information on the second uplink control channel resource. Optionally, the second feedback information and the A-CSI are indicated by same DCI.

In a possible implementation of the first aspect or the second aspect, the uplink information includes the A-CSI, the first feedback information, and second feedback information, and the sending the uplink information on the second uplink control channel resource includes: sending the A-CSI, the first feedback information, and the second feedback information on the second uplink control channel resource. Optionally, the second feedback information and the A-CSI are indicated by same DCI.

In a possible implementation of the first aspect, the second uplink control channel resource is used to carry only the A-CSI.

In a possible implementation of the first aspect or the second aspect, the first uplink control channel resource belongs to a first uplink control channel resource set, and the first uplink control channel resource set belongs to the first group of uplink control channel resource sets; and the second uplink control channel resource belongs to a second uplink control channel resource set, and the second uplink control channel resource set belongs to the second group of uplink control channel resource sets, where the first uplink control channel resource set is different from the second uplink control channel resource set. In this implementation, the network device directly configures different uplink control channel resource sets for the first feedback information and the uplink information that includes the A-CSI, to save communication resources.

In a possible implementation of the first aspect or the second aspect, the first uplink control channel resource belongs to a third uplink control channel resource set, the third uplink control channel resource set belongs to the first group of uplink control channel resource sets, and there is a first mapping relationship between the third uplink control channel resource set and an information payload of the first feedback information; and the second uplink control channel resource belongs to a fourth uplink control channel resource set, the fourth uplink control channel resource set belongs to the first group of uplink control channel resource sets or the second group of uplink control channel resource sets, and there is a second mapping relationship between the fourth uplink control channel resource set and a sum of an information payload of the A-CSI and an information payload of the feedback information sent on the second uplink control channel resource, where the first mapping relationship is different from the second mapping relationship. Because each uplink control channel resource set corresponds to one non-overlapped information payload range, the uplink control channel resource set may be mapped to different uplink control channel resource sets based on different mapping relationships. Optionally, when the fourth uplink control channel resource set belongs to the first group of uplink control channel resource sets, an information payload range corresponding to the fourth uplink control channel resource set is the smallest one of one or more information payload ranges larger than an information payload range corresponding to the third uplink control channel resource set.

According to the communication method provided in the first aspect or the second aspect, the terminal device sends the feedback information by using the first uplink control channel resource, and sends, by using the second uplink control channel resource, the uplink information that includes the A-CSI, where the first uplink control channel resource is different from the second uplink control channel resource. Therefore, the network device can identify, by using the control channel resource used by the received uplink information, whether the uplink information includes the A-CSI, so that the uplink information can be correctly received without a plurality of times of blind detection, and receiving complexity is low.

According to a third aspect, an embodiment provides a communication method. The method includes: receiving first DCI, where the first DCI is used to schedule first downlink data and indicate a terminal device to send A-CSI on an uplink control channel; receiving second DCI, where the second DCI is used to schedule second downlink data and indicate the terminal device to send an A-CSI report corresponding to the A-CSI; determining, based on the first DCI and the second DCI, uplink information and an uplink control channel resource that carries the uplink information; and sending the uplink information on the uplink control channel resource, where the second DCI is received later than the first DCI.

The second DCI may be used to indicate the terminal device to jointly send the A-CSI report and feedback information that corresponds to the second DCI.

The method may be performed by a terminal device or a communications apparatus, for example, a chip, that can be used in the terminal device.

According to a fourth aspect, an embodiment provides a communication method. The method includes: sending first DCI to a terminal device, where the first DCI is used to schedule first downlink data and trigger an A-CSI feedback; and sending second DCI to the terminal device, where the second DCI is used to schedule second downlink data and indicate the terminal device to send an A-CSI report corresponding to A-CSI, and the second DCI is sent later than the first DCI.

The method may be performed by a network device (for example, a base station) or a communications apparatus, for example, a chip, that can be used in the network device.

According to a fifth aspect, an embodiment provides a communication method. The method includes: determining an uplink control channel, where the uplink control channel is used to carry first A-CSI; determining an uplink data channel, where the uplink data channel is used to carry uplink data and/or second A-CSI, and the uplink control channel overlaps the uplink data channel in time domain; and sending information carried on a channel, with a higher priority, in the uplink control channel and the uplink data channel.

The method may be performed by a terminal device or a communications apparatus, for example, a chip, that can be used in the terminal device.

Optionally, the first A-CSI is triggered by DCI, for example, by DCI for scheduling downlink data.

In a possible implementation of the fifth aspect, the method further includes: muting a channel, with a lower priority, in the uplink control channel and the uplink data channel.

In a possible implementation of the fifth aspect, the method further includes: determining a priority sequence of the uplink control channel and the uplink data channel.

Optionally, the priority sequence may be preset and fixed. Alternatively, the priority sequence may be configured by a higher layer. Alternatively, the priority sequence is determined based on a type of a service of information carried on a channel. For example, a priority of an emergency service is higher than that of a non-emergency service. Alternatively, the priority sequence is determined based on a feature of a channel. The feature of the channel includes, for example, whether the uplink data channel is configured or dynamic, a scheduling/triggering sequence of the uplink data channel and the uplink control channel, or a sequence of start symbols of the uplink data channel and the uplink control channel.

According to the communication method provided in the fifth aspect, when the uplink data channel and the uplink control channel that carries the A-CSI overlap in time domain, the terminal device sends information carried on a channel with a higher priority, and mutes a channel with a lower priority. In this way, a problem that resources used to jointly transmit the A-CSI and the data are misplaced due to miss detection of the DCI that triggers the A-CSI is avoided, so that the A-CSI or the uplink data can be correctly received.

According to a sixth aspect, an embodiment provides a communication method. The method includes: receiving first DCI, where the first DCI is used to indicate a terminal device to send A-CSI on an uplink control channel; receiving second DCI, where the second DCI is used to schedule the terminal device to send uplink data on an uplink data channel, the second DCI includes indication information, and the indication information is used to indicate the terminal device to send the A-CSI on the uplink data channel; and sending the uplink data and the A-CSI on the uplink data channel based on the indication information, where the second DCI is not earlier than or later than the first DCI.

The method may be performed by a terminal device or a communications apparatus, for example, a chip, that can be used in the terminal device.

According to a seventh aspect, an embodiment provides a communication method. The method includes: sending first DCI to a terminal device, where the first DCI is used to indicate the terminal device to send A-CSI on an uplink control channel; sending second DCI to the terminal device, where the second DCI is used to schedule the terminal device to send uplink data on an uplink data channel, the second DCI includes indication information, and the indication information is used to indicate the terminal device to send the A-CSI on the uplink data channel; and receiving the uplink data and the A-CSI on the uplink data channel, where the second DCI is not earlier than or later than the first DCI.

The method may be performed by a network device (for example, a base station) or a communications apparatus, for example, a chip, that can be used in the network device.

In a possible implementation of the sixth aspect or the seventh aspect, the indication information may be a preset value in a bit field in the second DCI, and the bit field may be existing or specially set.

According to the communication method provided in the sixth aspect or the seventh aspect, the terminal device may send, in a time unit, a same A-CSI report on an uplink control channel and an uplink data channel that overlap, thereby improving a success rate of sending the A-CSI by the terminal device.

According to an eighth aspect, an embodiment provides a communications apparatus. The apparatus has a function of implementing behavior of the terminal device in the communication method shown in the first aspect, the third aspect, the fifth aspect, or the sixth aspect. The function may be implemented by hardware, or may be implemented by hardware executing corresponding software. The hardware or software includes one or more units or means corresponding to the function.

In a possible implementation, the apparatus includes a processor. The processor is configured to support the apparatus in performing a corresponding function of the terminal in the foregoing communication method. The apparatus may further include a memory. The memory may be coupled to the processor, and the memory stores program instructions and data. Optionally, the apparatus further includes a transceiver. The transceiver is configured to support communication between the apparatus and a network element such as a relay device or an access network device. The transceiver may be an independent receiver, an independent transmitter, or a transceiver having transmission and receiving functions.

In a possible implementation, the communications apparatus may be a terminal, or a component, for example, a chip, a chip system, or a circuit, that can be used in the terminal.

According to a ninth aspect, an embodiment provides a communications apparatus. The apparatus has a function of implementing behavior of the network device in the communication method shown in the second aspect, the fourth aspect, or the seventh aspect. The function may be implemented by hardware, or may be implemented by hardware executing corresponding software. The hardware or software includes one or more units or means corresponding to the function.

In a possible implementation, the apparatus includes a processor. The processor is configured to support the apparatus in performing a corresponding function of the network device in the foregoing communication method. The apparatus may further include a memory. The memory may be coupled to the processor, and the memory stores program instructions and data.

In a possible implementation, the communications apparatus may be a network device, for example, a base station, or a component, for example, a chip, a chip system, or a circuit, that can be used in the network device.

Optionally, the apparatus further includes a transceiver. The transceiver may be configured to: support communication between the network device and a terminal, and send information or instructions in the foregoing communication method to the terminal. The transceiver may be an independent receiver, an independent transmitter, or a transceiver having transmission and receiving functions.

According to a tenth aspect, an embodiment provides a communications system, including the network device and the terminal device in the foregoing aspects.

According to an eleventh aspect, an embodiment provides a computer-readable storage medium. The computer-readable storage medium stores instructions; and when the instructions are run on a computer, the computer is enabled to perform the communication method according to any one of the foregoing aspects.

According to a twelfth aspect, an embodiment provides a computer program product including instructions. When the computer program product runs on a computer, the computer is enabled to perform the communication method according to any one of the foregoing aspects.

BRIEF DESCRIPTION OF DRAWINGS

To describe technical solutions in embodiments more clearly, the following briefly describes the accompanying drawings for describing the embodiments. Clearly, the accompanying drawings in the following descriptions show merely some embodiments, and a person of ordinary skill in the art may still derive other accompanying drawings from these accompanying drawings without creative efforts.

FIG. 2(*b*) is a schematic diagram of a separate feedback scenario according to an embodiment;

DETAILED DESCRIPTION OF THE EMBODIMENTS

Technical solutions described in embodiments may be applied to a plurality of communications systems, for example, a 5G (fifth generation) system such as a long term evolution (LTE) system, a new radio (NR) system, and an evolved LTE (eLTE) system, or another next generation communications system.

Figure 1:
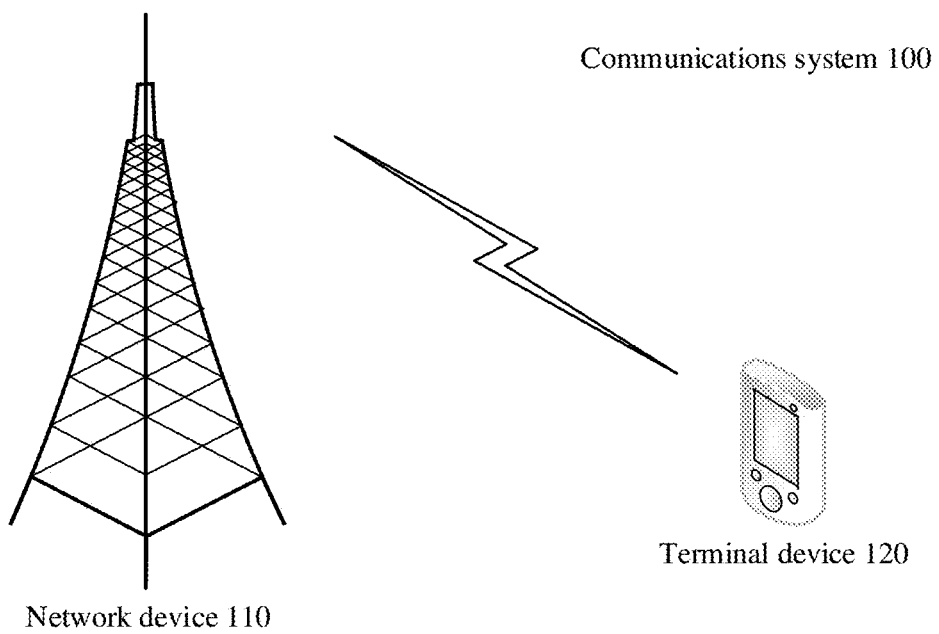
FIG. 1 is a schematic diagram of a communications system according to an embodiment.

FIG. 1 is a schematic diagram of a communications system 100 according to an embodiment.

As shown in FIG. 1, the communications system 100 includes a network device 110 and a terminal device 120. The terminal device 120 communicates with the network device 110 through an electromagnetic wave. When the terminal device 120 sends information, a wireless communications module of the terminal device 120 may obtain information bits that need to be sent to the network device 110 over a channel. For example, the information bits are information bits generated by a processing module of the terminal device, received from another device, or stored in a storage module of the terminal device. In an embodiment, the terminal device 120 may be used as an entity that sends uplink data to transmit an uplink channel (where the uplink channel may carry the uplink data) to the network device 110. Certainly, the terminal device 120 may also receive downlink data directly sent by the network device 110 or forwarded by a network node such as a relay device.

In this application, the terminal device 120 may be a device of various types that provides a user with voice and/or data connectivity, for example, may be a handheld device with a wireless connection function, or a processing device connected to a wireless modem. The terminal device 120 may communicate with a core network through an access network, for example, a radio access network (RAN), and exchange a voice and/or data with the RAN. The terminal device 120 may include user equipment (UE), a wireless terminal device, a mobile terminal device, a subscriber unit, a subscriber station, a mobile station, a remote station, an access point (AP), a remote terminal device (remote terminal), an access terminal device (access terminal), a user terminal device (user terminal), a user agent, a user device, or the like. For example, the terminal device 120 may include a mobile phone (which is also referred to as a "cellular" phone), a computer having a mobile terminal device, a portable, pocket-sized, handheld, computer built-in, or in-vehicle mobile apparatus, a smart wearable device, or the like. For example, the terminal device 120 is a device such as a personal communications service (PCS) phone, a cordless phone, a session initiation protocol (SIP) phone, a wireless local loop (WLL) station, a personal digital assistant (PDA), a smart band, or a smart watch. The terminal device 120 further includes a limited device, for example, a device with low power consumption, a device with a limited storage capability, or a device with a limited computing capability. For example, the terminal device 120 includes an information sensing device, for example, a barcode, radio frequency identification (RFID), a sensor, a global positioning system (GPS), or a laser scanner. In addition, the terminal device 120 may alternatively be an unmanned aerial vehicle device. In the embodiments, a chip used in the foregoing device may also be referred to as a terminal device.

In this application, the network device 110 may be an access network device, and the access network device may be configured to connect the terminal device 110 to an access network such as a RAN. The network device 110 may be a base station defined in the 3rd generation partnership project (3GPP), for example, may be a base station device, namely, an evolved NodeB (eNB/eNodeB), in an LTE system; or may be an access network side device in an NR system. The network device 110 includes a gNB, a transmission point (TRP), a home evolved NodeB (for example, home evolved NodeB, or home NodeB, HNB), a baseband unit (BBU), or an access network device including a central unit (CU) and a distributed unit (DU). The CU may also be referred to as a control unit. A CU-DU structure is used to separate a protocol layer of a base station. Functions of some protocol layer are centrally controlled by the CU, and functions of some or all of remaining protocol layer are distributed in the DU, and the CU centrally controls the DU. In addition, when the eNB is connected to a 5G core network (5G-Core, 5G CN), the LTE eNB may also be referred to as an eLTE eNB. In an embodiment, the eLTE eNB is an evolved LTE base station device based on the LTE eNB, and may be directly connected to the 5G CN. The eLTE eNB also belongs to a base station device in NR. The network device 110 may alternatively be a wireless terminal (WT), for example, an AP, an access controller (AC), or another network device, for example, a relay device, a vehicle-mounted device, or an intelligent wearable device, that has a capability of communicating with a terminal and a core network. A type of the network device is not limited in the embodiments.

The communications system 100 is merely an example for description, and a communications system to which this application is applicable is not limited thereto. For example, quantities of network devices and terminal devices included in the communications system 100 are merely examples, and the communications system 100 may include more than one terminal device and more than one network device. One network device may manage one or more terminal devices. In other words, one or more terminal devices may access a network through a same network device. In addition, the communications system 100 may further include another device, for example, may further include a wireless relay device, a wireless backhaul device, and the like, which are not shown in FIG. 1.

As defined in the embodiments, a one-way communication link from an access network to a terminal is a downlink, data transmitted on the downlink is downlink data, and a transmission direction of the downlink data is referred to as a downlink direction; a one-way communication link from the terminal to the access network is an uplink, data transmitted on the uplink is uplink data, and a transmission direction of the uplink data is referred to as an uplink direction.

A resource described in the embodiments may also be referred to as a transmission resource. The resource includes one or more of a time domain resource, a frequency domain resource, and a code channel resource, and may be used to carry data or signaling in an uplink communication process or a downlink communication process.

A time unit described in the embodiments is a unit of a time domain resource used for wireless communication between a network device and a terminal device. A segment of time domain resource may be divided into a plurality of time units. In addition, in this application, the plurality of time units may be consecutive, or may be inconsecutive. In other words, there is a preset time interval between some adjacent time units. A length of one time unit is not limited in this application. For example, one time unit may be one or more subframes. Alternatively, one time unit may be one or more slots. Alternatively, one time unit may be one or more symbols. The symbol is also referred to as a time domain symbol, and the time domain symbol may be an orthogonal frequency division multiplexing (OFDM) symbol, or may be a single carrier frequency division multiple access (SC-FDMA) symbol.

A codebook described in the embodiments includes a set of ACKs/NACKs that are fed back in an uplink time unit and that correspond to downlink data. Downlink data transmission corresponding to an ACK/a NACK is directly scheduled by DCI or is sent in a preset pattern after one piece of DCI is activated. Therefore, it may be considered that the ACK/NACK is triggered by the DCI, and the DCI may further indicate/trigger the terminal device to feed back A-CSI. The terminal device may simultaneously send the codebook and the A-CSI to the network device in a same uplink time unit, or may separately send the codebook and the A-CSI to the network device in different uplink time units. The codebook in the embodiments includes a dynamic codebook and a semi-persistent codebook. It may be understood that the codebook may further include other uplink information. This is not limited.

The dynamic codebook is also referred to as a type 2 (Type 2) codebook. The terminal device may detect a PDCCH in each PDCCH monitoring occasion, obtain downlink control information (DCI), and determine, based on a time domain resource allocation field and a PDSCH-to-HARQ-timing field in the DCI, an ACK feedback slot/a NACK feedback slot corresponding to a PDSCH scheduled by the PDCCH. The terminal device first determines a slot number of the PDSCH based on a slot number of the PDCCH and a slot offset (K0), from the PDCCH to the PDSCH, that is included in the time domain resource allocation field, and then obtains, based on the PDSCH-to-HARQ-timing field, a timing offset (K1), namely, an offset from a slot of the PDSCH to a feedback slot corresponding to the PDSCH, to determine a slot in which the ACK/NACK is sent. For an uplink slot, the terminal device may feed back only an actually scheduled ACK/NACK that points to the slot. When scheduling data and triggering the ACK/NACK, the base station counts downlink data of a same uplink slot to which the ACK/NACK points. A value corresponding to a counter may be indicated by using a downlink assignment index (DAI), and the DAI is included in the DCI. Therefore, the UE may determine, based on the DAI in the received PDCCH, whether the UE misses detecting a piece of DCI, so that a size of the codebook for feeding back the ACK/NACK is correct.

The semi-persistent codebook is also referred to as a type 1 (Type 1) codebook. The network device configures a K1 set and a time domain resource allocation table for the terminal device by using a predefinition in a protocol or by using higher layer signaling. The terminal device determines a candidate time domain position of a PDSCH based on the time domain resource allocation table, and determines, based on the candidate time domain position of the PDSCH and the K1 set, a slot in which feedback information of the PDSCH may be located. In each uplink slot, the terminal device determines, based on the candidate time domain position of the PDSCH and the K1 set, a downlink PDSCH occasion set associated with the uplink slot, namely, an associated downlink slot and a PDSCH occasion set in the downlink slot, and then generates the codebook based on the associated downlink PDSCH occasion set. In other words, for an uplink slot, a size of a fed back semi-persistent codebook is fixed, and the codebook may include all ACKs/NACKs that may point to downlink data transmission in the slot.

It may be understood that an example in which a time unit is a slot is used to describe the foregoing dynamic codebook and semi-persistent codebook. This does not constitute any limitation on this application.

An uplink control channel resource set in the embodiments includes one or more uplink control channel resources. For example, an uplink control channel is a PUCCH. Currently, K (where $1 \leq K \leq 4$) PUCCH resource sets are configured in an NR system, the $k^{th}$ PUCCH resource set (where k=0, 1, 2, or 3) is used to carry an ACK/a NACK, and a value range of a payload size, $N_{UCI}$, of the ACK/NACK is $N_k \leq N_{UCI} \leq N_{k+1}$, where $N_{UCI}$ represents a quantity of bits of UCI, and N is a positive integer. Currently, in the NR system, $N_0=1$, $N_1=3$, and $N_4=1706$ are specified. In other words, the payload size of the ACK/NACK may also be represented by the quantity of bits of the UCI. A group of uplink control channel resource sets in the embodiments may also be referred to as an uplink control channel resource set group. One uplink control channel resource group may include one or more uplink control channel resource sets. The one or more uplink control channel resource sets may be defined in an existing protocol, or may be newly defined in this application. This is not limited.

It should be understood that the term "and/or" describes only an association relationship between associated objects and represents that three relationships may exist. For example, A and/or B may represent the following three cases: Only A exists, both A and B exist, and only B exists. In addition, the character "/" indicates an "or" relationship between the associated objects.

It should be understood that in the embodiments, "B corresponding to A" indicates that B is associated with A. In an implementation, B may be determined based on A. However, it should be further understood that determining B based on A does not mean that B is determined based on only A, and B may be determined based on A and/or other information. In the embodiments, "a plurality of" means two or more than two.

Descriptions such as "first", "second", and "third" in the embodiments are merely used for indicating and distinguishing between described objects, do not show a sequence, do not indicate that a quantity of pieces of information is limited in the embodiments, and cannot constitute any limitation on the embodiments.

In the embodiments, "connection" means various connection manners such as a direct connection or an indirect connection, for implementing communication between devices. This is not limited in the embodiments.

Unless otherwise specified, "transmission" (transmit/transmission) in the embodiments refers to bidirectional transmission, and includes a sending action and/or a receiving action. For example, "transmission" in the embodiments includes data sending, data receiving, or data sending and receiving. That is, the data transmission herein includes uplink data transmission and/or downlink data transmission. Data may include a channel and/or a signal. Uplink data transmission is uplink channel transmission and/or uplink signal transmission, and downlink data transmission is downlink channel transmission and/or downlink signal transmission.

A service in the embodiments is a communications service obtained by a terminal from a network side, and includes a control plane service and/or a data plane service, for example, a voice service or a data traffic service. The sending or receiving of the service includes sending or receiving of service-related data or signaling.

In the embodiments, a "network" and a "system" express a same concept, and a communications system is a communications network.

In this application, unless otherwise specified, an element represented in a singular form is intended to represent "one or more", and is not merely intended to represent "one and only one". "Some" may refer to one or more.

The following uses an example in which the communications system 100 is an NR system for description.

In a communication process between the terminal device 120 and the network device 110, the terminal device 120 may perform CSI measurement and feed back a measurement result to the network device 110, so that the network device 110 can improve performance of a communication link in a manner such as adjusting transmit signal strength, thereby improving service transmission reliability.

An A-CSI feedback is a type of CSI feedback. When a service arrives, the A-CSI feedback may be triggered in a DCI triggering manner, an implicit triggering manner, or the like, to assist in improving subsequent data transmission quality. The A-CSI feedback may be carried on an uplink data channel, for example, a PUSCH. Alternatively, the A-CSI feedback may be carried on an uplink control channel, for example, a physical uplink control channel (physical uplink control channel, PUCCH). In a possible implementation, DCI for scheduling downlink data also triggers the terminal device to feed back A-CSI on a short uplink control channel (short PUCCH, sPUCCH). This can reduce DCI overheads and implement a fast A-CSI feedback.

For the A-CSI feedback performed on the sPUCCH, if a PUCCH resource that carries the A-CSI and the PUCCH resource that carries the ACK/NACK (hereinafter referred to as "A/N") overlap in time domain, the A-CSI and the A/N may be jointly fed back. In an embodiment, the terminal device 120 may jointly encode the A-CSI and the A/N, and select, based on an ARI in the latest piece of received DCI, the PUCCH resource to carry the A-CSI and the A/N.

The joint feedback of the A-CSI and the A/N in this application may be a joint feedback (or referred to as joint transmission) of the A-CSI and the A/N corresponding to downlink data scheduled by the DCI that triggers the A-CSI. Alternatively, the joint feedback may be a joint feedback of the A-CSI and the A/N corresponding to downlink data scheduled by other DCI. This is not limited.

FIG. 2(*a*) is an example in which the A-CSI and the A/N are jointly fed back in a joint feedback mode. In the joint feedback mode, because the DCI that triggers the A-CSI also schedules the downlink data, if the terminal device 120 feeds back the A/N for the downlink data, the A-CSI and the A/N may be jointly fed back in a same slot and on a same PUCCH resource. As shown in FIG. 2(*a*), DCI 1 schedules the downlink data in an uplink slot 0 (slot 0), and indicates, by using a value 01 of a CSI request field in the DCI, that one piece of A-CSI is triggered to be fed back on an sPUCCH. In addition, the DCI 1 indicates, by using a value 2 of a PDSCH-to-HARQ-ACK-timing field K1 in the DCI 1, that a first A/N and the A-CSI that correspond to the downlink data are jointly fed back in an uplink slot 2. However, in an uplink slot 1, DCI 2 schedules the downlink data but does not trigger the A-CSI, and indicates, by using a value 1 of the PDSCH-to-HARQ-ACK-timing field K1 in the DCI 2, that a second A/N corresponding to the downlink data scheduled by the DCI 2 is fed back in the slot 2. Therefore, in the scenario in FIG. 2(*a*), the A-CSI, the first A/N, and the second A/N are jointly fed back.

FIG. 2(*b*) is an example in which the A-CSI and the A/N are jointly fed back in a separate feedback mode. In the separate feedback mode, although the DCI that triggers the A-CSI also schedules the downlink data, the terminal device 120 separately feeds back, in different slots or on different PUCCH resources in a same slot, the A-CSI triggered by the DCI and the A/N corresponding to the downlink data. In addition, the network device 110 indicates, to the terminal device 120, a slot and/or a PUCCH resource for the A-CSI feedback. As shown in FIG. 2(*b*), DCI 1 schedules the downlink data in a slot 0 and indicates, by using a value 01 of a CSI request field in the DCI 1, that one piece of A-CSI is triggered to be fed back on an sPUCCH. In addition, the DCI 1 indicates, by using a value 1 of a PDSCH-to-HARQ-ACK-timing field K1 in the DCI 1, that a first A/N corresponding to the downlink data is fed back in an uplink slot 1, and indicates, by using a value 2 of a timing field Y of the A-CSI, that the A-CSI is fed back in an uplink slot 2. However, in the slot 1, the downlink data is scheduled by the DCI 2, and the A-CSI is not triggered. The value 1 of the PDSCH-to-HARQ-ACK-timing field K1 in the DCI 2 is used to indicate that a second A/N corresponding to the downlink data scheduled by the DCI 2 is fed back in the slot 2. Therefore, in the scenario in FIG. 2(*b*), the A-CSI and the first A/N are separately fed back, and the A-CSI and the second A/N are jointly fed back.

It may be understood that the foregoing joint feedback mode and separate feedback mode are distinguished based on whether the A-CSI and the A/N indicated by the DCI that triggers the A-CSI are jointly fed back. In the separate feedback mode, the A-CSI may overlap the A/N indicated by other DCI. In this way, the joint feedback is performed.

In the embodiments, "overlapping in time domain" or "overlapping" may mean that time units occupied in time domain completely or partially overlap, and the time unit may be a symbol or a slot. For example, in the 2(*a*) scenario, the A-CSI, the first A/N, and the second A/N may be fed back in a same slot, and occupied slots overlap. Even if the A-CSI, the first A/N, and the second A/N occupy different symbols in a same slot, this still falls within the scope of "overlapping in time domain" described in the embodiments. In the 2(*b*) scenario, symbols occupied by the A-CSI and the second A/N overlap, and this falls within the scope of "overlapping in time domain" described in the embodiments.

For either of the foregoing scenarios, if the terminal device 120 misses detecting the DCI 1, it is considered that only the A/N needs to be fed back in the slot 2, and the A-CSI does not need to be fed back. In this case, the terminal device 120 feeds back only the A/N. However, the network device 110 still receives the A/N according to a rule that the terminal device 120 simultaneously feeds back the A/N and the A-CSI, and consequently the A/N also fails to be received.

To resolve this problem, the embodiments provides a communication method. Different uplink control channel resources are allocated to feedback information such as an ACK/a NACK and uplink information that includes A-CSI, so that a network device can correctly receive the uplink information sent by a terminal device without a plurality of times of blind detection, thereby reducing receiving complexity.

For ease of description, the communication method shown in the embodiments is described by using an example in which the terminal device and the network device are execution bodies. It may be understood that the communication method described in the embodiments may also be executed by another communications apparatus, for example, a chip. Details are not described below again.

Figure 3:
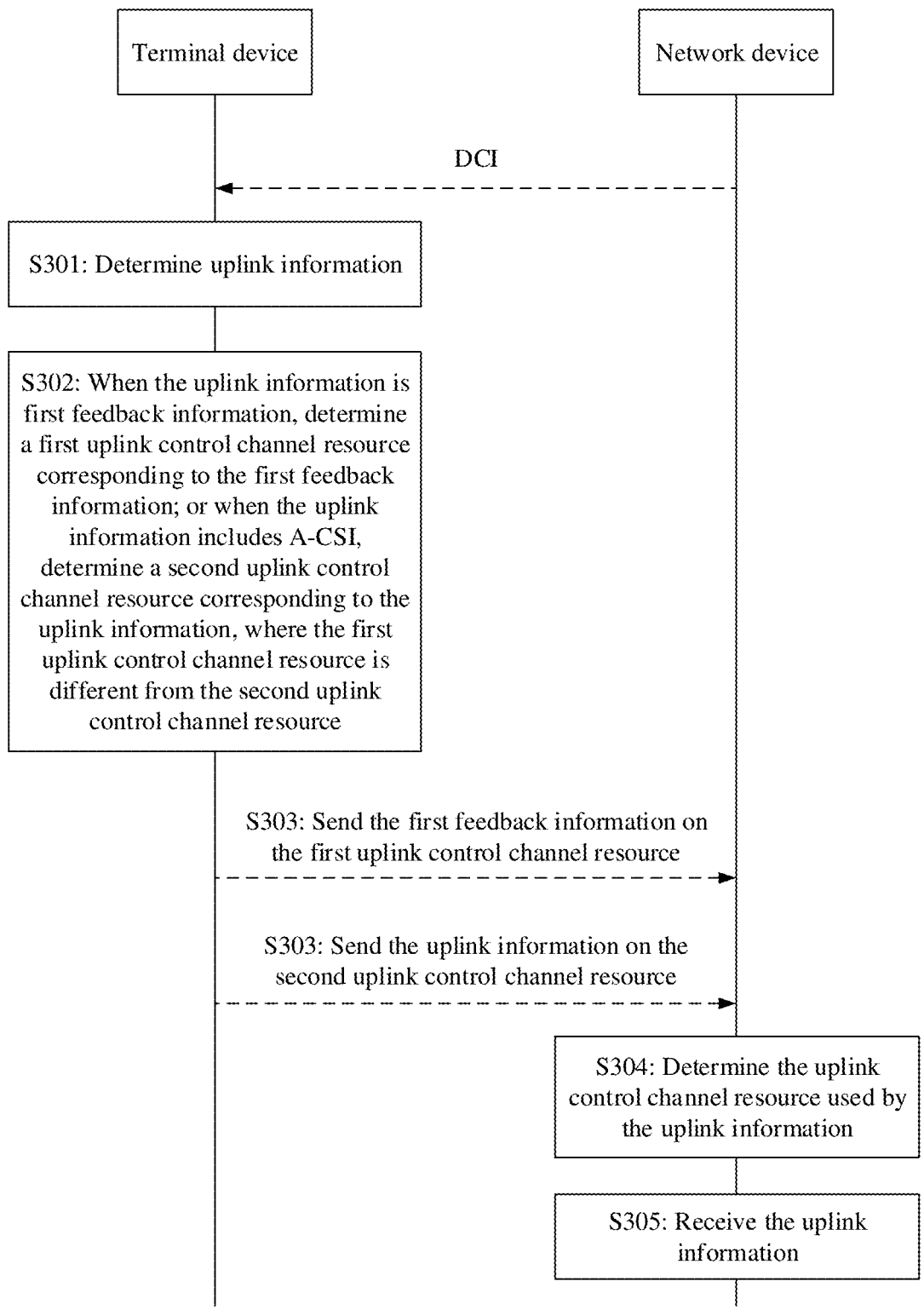
FIG. 3 is a schematic flowchart of a communication method according to an embodiment.

FIG. 3 is a schematic flowchart of a communication method according to an embodiment. The method includes the following steps.

S301: A terminal device determines uplink information.

In an embodiment, the uplink information includes feedback information and/or A-CSI. The feedback information may include feedback information corresponding to downlink data scheduled by DCI used to indicate to send the A-CSI and/or feedback information corresponding to downlink data scheduled by other DCI. The feedback information may be an ACK/a NACK, the ACK may indicate that the downlink data transmission is correctly decoded, and the NACK may indicate that downlink data transmission is incorrectly decoded.

It may be understood that, in this embodiment, the terminal device is not limited to determining and sending uplink information other than the feedback information and/or the A-CSI. For example, the terminal device may further determine and send uplink information of another type such as a scheduling request (SR).

For ease of description, in this embodiment, the DCI used to indicate to send the A-CSI may also be referred to as first DCI. In an embodiment, the first DCI may be used to indicate the terminal device to send the A-CSI on an uplink control channel, and may be further used to schedule the downlink data. The feedback information corresponding to the downlink data and the A-CSI may be jointly fed back or separately fed back. The A-CSI may refer to an A-CSI report, and information included in the A-CSI may be specified by a report identifier (report ID) of the A-CSI.

In this embodiment, the feedback information corresponding to the downlink data scheduled by the DCI may also be referred to as feedback information corresponding to the DCI for short. Details are not described below again.

In an implementation, the method further includes: The terminal device receives the first DCI, where the first DCI is used to indicate the terminal device to send the A-CSI on the uplink control channel.

Optionally, in an implementation, the method further includes: The terminal device further receives one or more pieces of DCI from a network device after receiving the first DCI, where the one or more pieces of DCI are used to indicate the terminal device to jointly send the feedback information corresponding to the DCI and the A-CSI report corresponding to the A-CSI. The terminal device is repeatedly indicated to send the A-CSI report, to improve a success rate of sending the A-CSI by the terminal device.

The uplink control channel in this embodiment may be a PUCCH. In an embodiment, the uplink control channel may be an sPUCCH, or may be another control channel that may be used to carry the uplink information such as the feedback information and/or the A-CSI. This is not limited.

S302: When the uplink information is first feedback information, the terminal device determines a first uplink control channel resource corresponding to the first feedback information; or when the uplink information includes the A-CSI, the terminal device determines a second uplink control channel resource corresponding to the uplink information, where the first uplink control channel resource is different from the second uplink control channel resource.

S303: The terminal device sends the first feedback information on the first uplink control channel resource or sends the uplink information on the second uplink control channel resource.

In an embodiment, the first feedback information may be a set of feedback information corresponding to downlink data separately scheduled by one or more pieces of DCI (where in this embodiment, "second DCI" and "third DCI" are used as an example for description) other than the first DCI. The first feedback information may be included in a first codebook. For example, the terminal device may receive the second DCI from the network device, receive, based on the second DCI, second downlink data scheduled by the second DCI, and generate, based on a decoding result of the second downlink data, feedback information corresponding to the second downlink data. The terminal device may further receive the third DCI from the network device, receive, based on the third DCI, third downlink data scheduled by the third DCI, and generate, based on a decoding result of the third downlink data, feedback information corresponding to the third downlink data. In this way, the first feedback information may include the feedback information corresponding to the second downlink data and the feedback information corresponding to the third downlink data. In an example, the terminal device may always attempt to receive the DCI until a time point, for example, the $N^{th}$ symbol before an uplink slot n (where n and N are both positive integers). After the time point, UE still keeps receiving the DCI, and the UE may start to prepare to send, in the uplink slot n, uplink information corresponding to the DCI received before the time point, for example, the first feedback information.

The uplink control channel resource in this embodiment is a transmission resource used by an uplink control channel. In this application, sending information on the uplink control channel resource may also be understood as sending information on the uplink control channel.

That the first uplink control channel resource is different from the second uplink control channel resource includes: Values of the two transmission resources in at least one resource dimension are not completely the same. For example, one or more of the following cases may be included: Time domain symbols occupied by the two resources in time domain are different; subcarriers or resource blocks (radio block, RB) occupied by the two resources in frequency domain are different; and code channels (for example, values of cyclic shifts of sequences or values of orthogonal masks) occupied by the two resources in code domain are different. In other words, a first uplink control channel and a second uplink control channel may use different transmission resources.

Optionally, in an implementation, that the terminal device sends the uplink information on the second uplink control channel resource includes: The terminal device sends the A-CSI and second feedback information on the second uplink control channel resource. Optionally, the second feedback information and the A-CSI are indicated by same DCI.

Optionally, in an implementation, that the terminal device sends the uplink information on the second uplink control channel resource includes: The terminal device sends the A-CSI, the first feedback information, and the second feedback information on the second uplink control channel resource. Optionally, the second feedback information and the A-CSI are indicated by same DCI.

The feedback information (for example, the second feedback information and/or the first feedback information) sent on the second uplink control channel resource may be included in a second codebook, and the second codebook is different from the first codebook.

Optionally, in an implementation, that the terminal device sends the uplink information on the second uplink control channel resource includes: The terminal device sends the A-CSI and the first feedback information on the second uplink control channel resource.

Figure 2A:
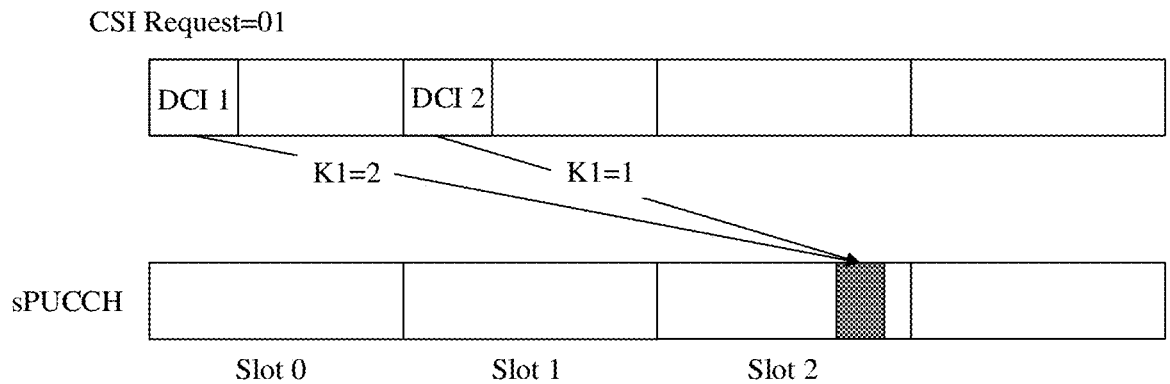
FIG. 2(*a*) is a schematic diagram of a joint feedback scenario according to an embodiment.
Figure 2B:
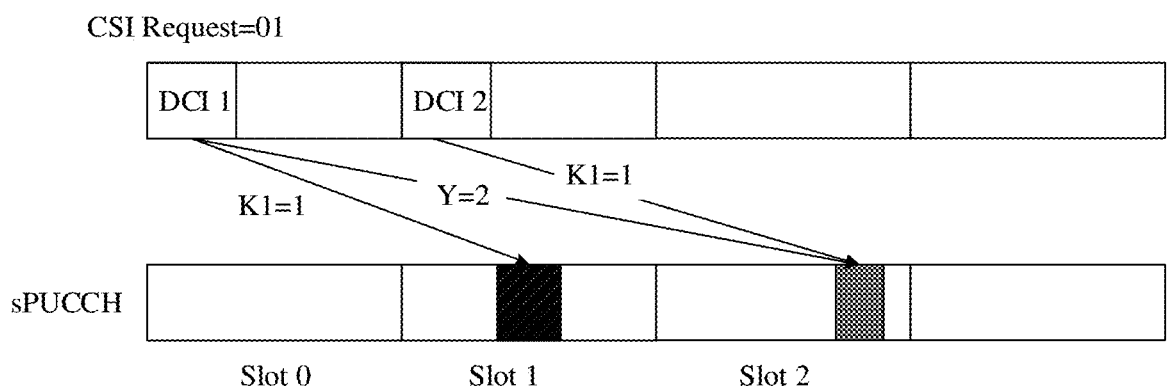

In an example, when the uplink control channel that carries the A-CSI and the uplink control channel that carries the feedback information overlap in time domain, and a preset condition is satisfied, the A-CSI and the feedback information may be jointly fed back on a same uplink control channel resource, that is, the A-CSI and the feedback information is sent on the same uplink control channel resource, and types of the joint feedback may include two types shown in FIG. 2(a) and FIG. 2(b). Details are not described. The feedback information may include the feedback information corresponding to the first DCI and the feedback information corresponding to the downlink data separately scheduled by the one or more pieces of DCI (for example, the foregoing "second DCI" and "third DCI") other than the first DCI. For example, in the scenario in FIG. 2(a), the second feedback information is the feedback information corresponding to the downlink data scheduled by the DCI (namely, the first DCI) that triggers the A-CSI, that is, the second feedback information and the A-CSI are indicated by same DCI, and the first feedback information is the feedback information corresponding to the downlink data scheduled by another piece of DCI (for example, the foregoing "second DCI"). Because the uplink control channel that carries the first feedback information and the second feedback information overlaps the uplink control channel that carries the A-CSI in time domain, the A-CSI, the first feedback information, and the second feedback information are jointly encoded. Alternatively, the feedback information may include the feedback information corresponding to the downlink data separately scheduled by the one or more pieces of DCI (for example, the foregoing "second DCI" and "third DCI") other than the first DCI. For example, in the scenario in FIG. 2(b), the feedback information may be the feedback information separately corresponding to the one or more pieces of DCI other than the first DCI, namely, the first feedback information, and the first feedback information and the A-CSI are jointly encoded.

Optionally, the preset condition includes: A distance between an end symbol of a downlink control channel that carries the first DCI and an earlier start symbol in a start symbol of the uplink control channel that carries the A-CSI and a start symbol of the uplink control channel that carries the feedback information is larger than or equal to a first threshold; and/or a distance between an end symbol of a downlink data channel corresponding to the feedback information and the earliest start symbol in a start symbol of the uplink control channel that carries the A-CSI and a start symbol of the uplink control channel that carries the feedback information is larger than or equal to a second threshold, where the first threshold and the second threshold may be configured by a higher layer or predefined.

An example in which the feedback information is an ACK/a NACK and the uplink control channel is a PUCCH is used to describe generation and sending of the first codebook and the second codebook. In this example, the terminal device may separately receive the first DCI, the second DCI, and the third DCI from the network device. The first DCI indicates the terminal device to feed back the A-CSI and schedule first downlink data, the second DCI schedules second downlink data, and the third DCI schedules third downlink data. The terminal device generates a first ACK/NACK based on the first downlink data, generates a second ACK/NACK based on the second downlink data, and generates a third ACK/NACK based on the third downlink data. If the terminal device does not receive the first DCI successfully, for example, the terminal device misses detecting the first DCI, the terminal device determines that the uplink information is the first feedback information. That is, the uplink information includes the first codebook corresponding to the second ACK/NACK and the third ACK/NACK. Then, the terminal device may send the first codebook on a first PUCCH resource. When the terminal device successfully receives the first DCI, for example, the terminal device does not miss detecting the first DCI, the terminal device determines that the uplink information is the A-CSI, the first feedback information, and the second feedback information. That is, the uplink information includes the second codebook corresponding to the first ACK/NACK, the second ACK/NACK, and the third ACK/NACK, and the A-CSI indicated by the first DCI. Then, the terminal device may send the second codebook and the A-CSI on a second PUCCH resource. The first PUCCH resource is different from the second PUCCH resource.

Optionally, when the A-CSI is set to be fed back separately, or the DCI received by the terminal device does not schedule data, the uplink information may include only the A-CSI, and the second uplink control channel resource may be used to carry/send only the A-CSI.

After the terminal device sends the uplink information to the network device, the method further includes the following steps.

S304: The network device determines the uplink control channel resource used by the uplink information.

S305: The network device receives the uplink information.

In an embodiment, the network device performs energy detection, sequence detection, or other blind detection that does not depend on demodulation/decoding on the first uplink control channel resource or the second uplink control channel resource, to determine an uplink control channel resource used by the terminal device. If the first uplink control channel resource is detected, it indicates that the uplink information does not include the A-CSI, and the network device may receive the uplink information in a manner of receiving the feedback information. If the second uplink control channel resource is detected, it indicates that the uplink information includes the A-CSI, and the network device may receive the uplink information in a manner of receiving the feedback information and the A-CSI. A specific manner of receiving the uplink information may be any receiving manner. For example, the network device receives the uplink information based on a quantity of bits of UCI fed back by the terminal device. This is not limited.

According to the communication method provided in this embodiment, the terminal device sends the feedback information by using the first uplink control channel resource, and sends the uplink information (for example, the A-CSI and the feedback information) that includes the A-CSI by using the second uplink control channel resource, where the first uplink control channel resource is different from the second uplink control channel resource. Therefore, the network device identifies, by using a control channel resource used by the received uplink information, whether the uplink information includes the A-CSI, so that the uplink information can be correctly received without a plurality of times of blind detection, and receiving complexity is low.

Detailed descriptions of the communication method provided in this application are provided in implementations shown in FIG. 4 to FIG. 8 based on the embodiment shown in FIG. 3. The implementations shown in FIG. 4 to FIG. 8 each list several specific manners of determining the uplink control channel resource (for example, the second uplink control channel resource) that carries the uplink information including the A-CSI and the uplink control channel resource (for example, the first uplink control channel resource) that carries the feedback information. It may be understood that: Mutual reference may be made between the implementations provided in this application, and the content described above is not described again.

Figure 4:
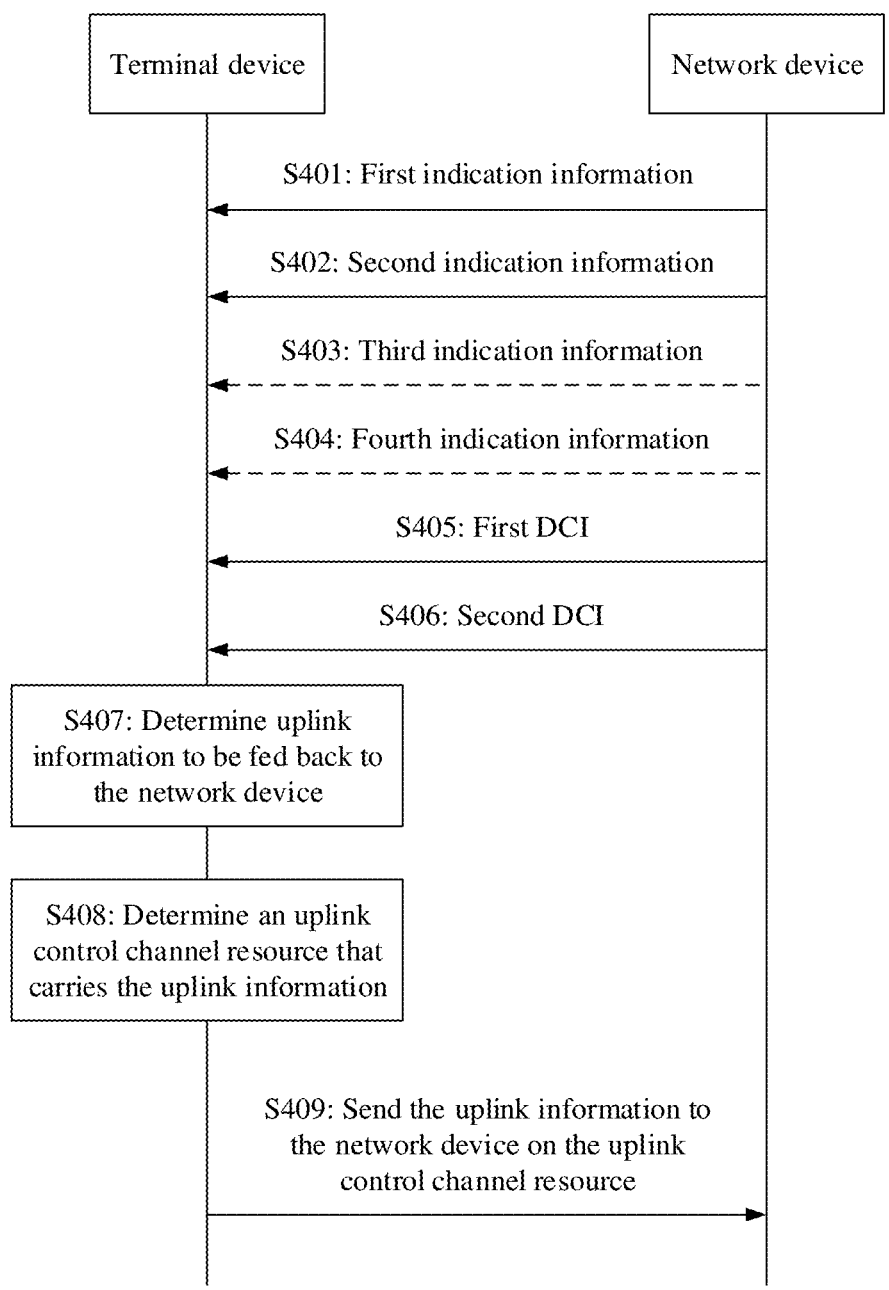
FIG. 4 is a schematic flowchart of a communication method according to an embodiment.
Figure 5:
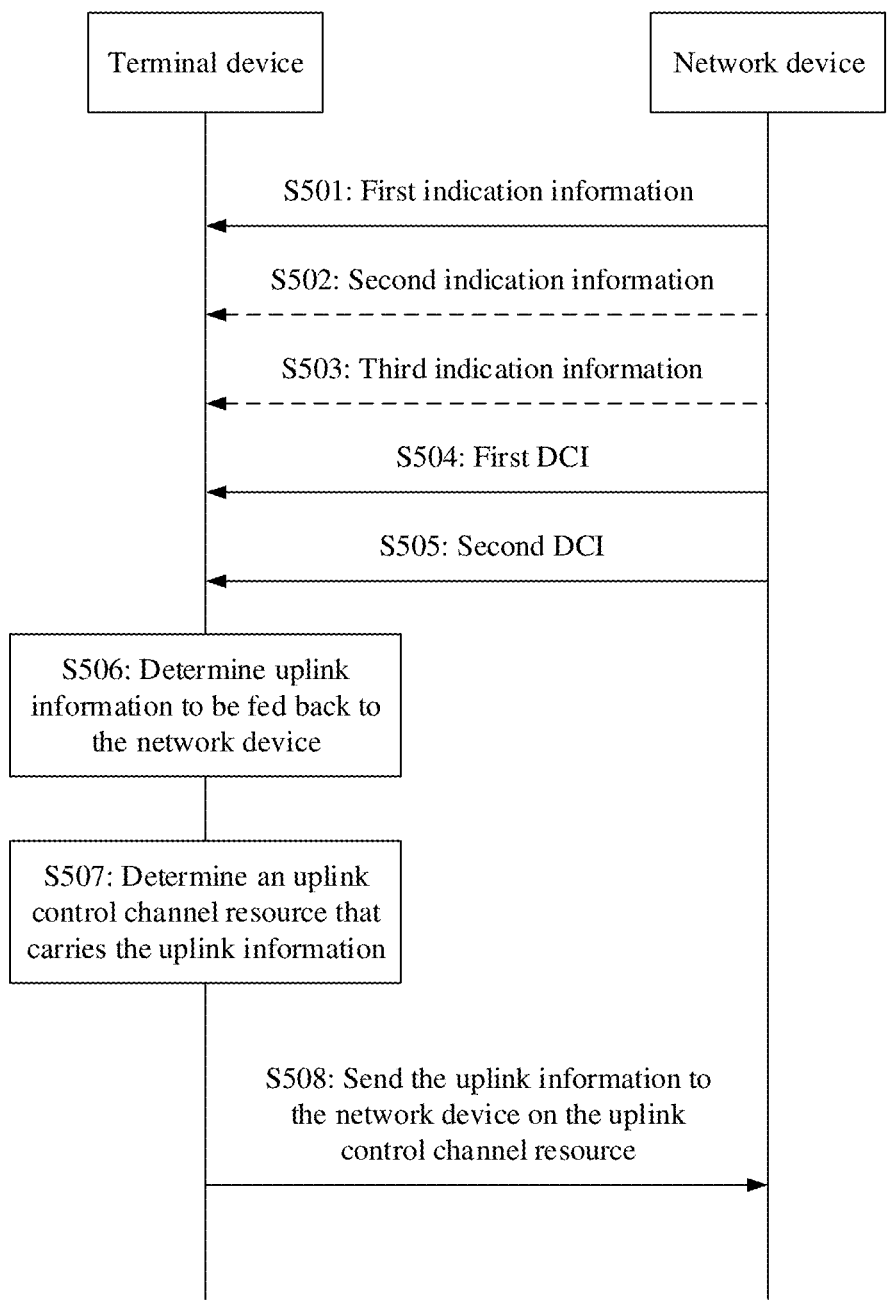
FIG. 5 is a schematic flowchart of a communication method according to an embodiment.
Figure 6:
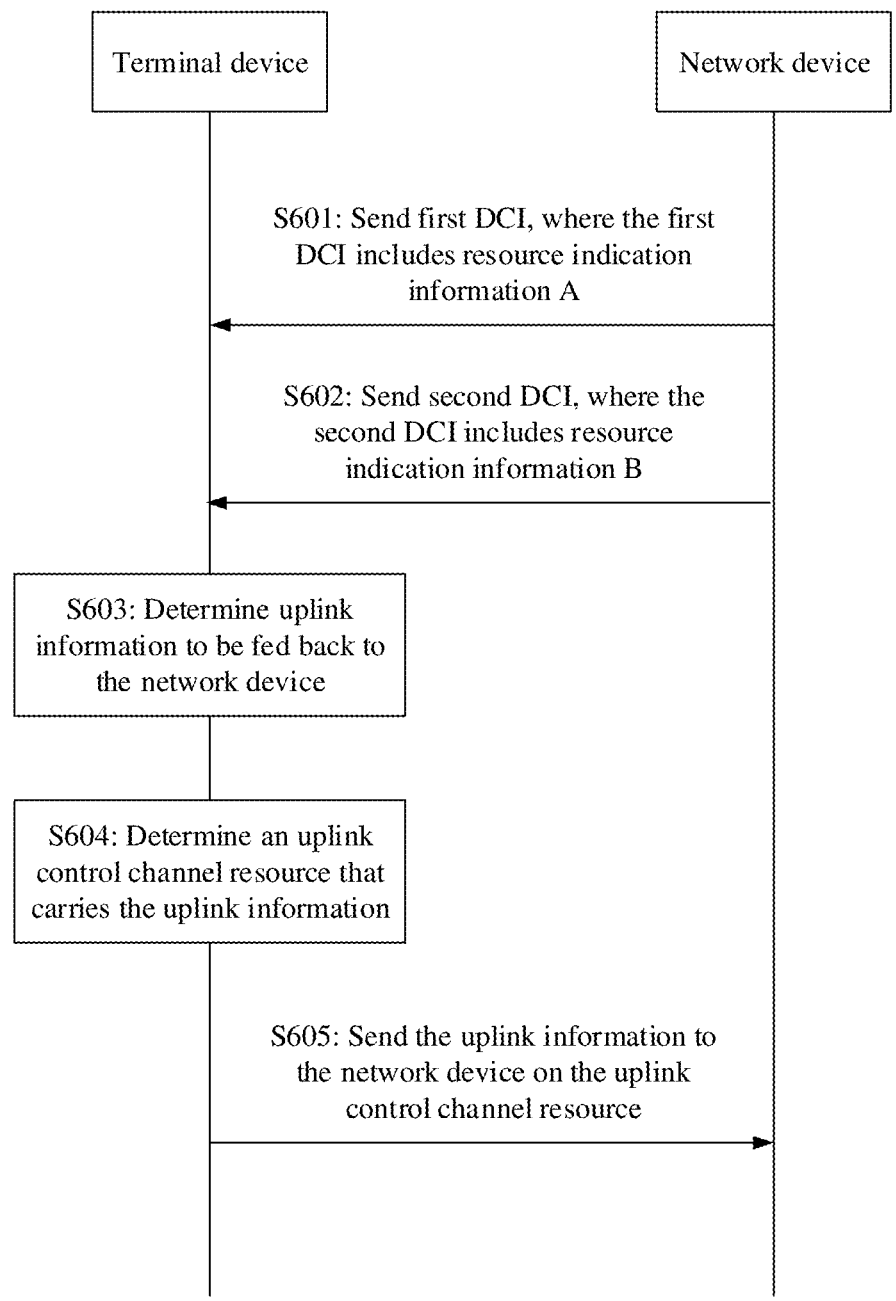
FIG. 6 is a schematic flowchart of a communication method according to an embodiment.
Figure 7:
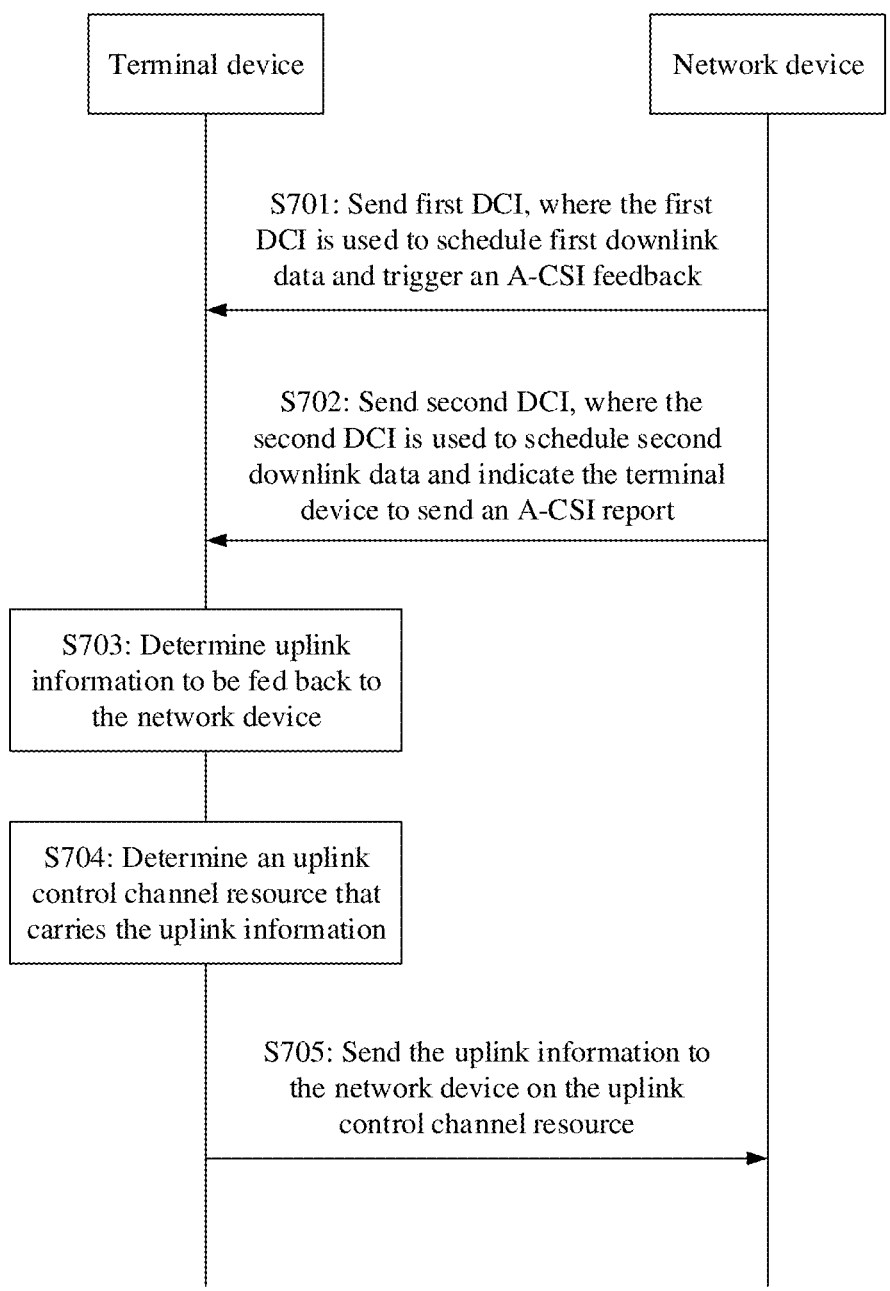
FIG. 7 is a schematic flowchart of a communication method according to an embodiment.

In an implementation, the network device configures two different uplink control channel resource sets for the terminal device, and the uplink control channel resource that carries the uplink information including the A-CSI and the uplink control channel resource that carries the feedback information are respectively selected from the two resource sets. As shown in FIG. 4, the method includes the following steps.

S401: The terminal device receives first indication information from the network device, where the first indication information is used to indicate a first group of uplink control channel resource sets, and the first group of uplink control channel resource sets includes at least one uplink control channel resource set.

For brevity of description, an "uplink control channel resource set", a "first group of uplink control channel resource sets", and a "second group of uplink control channel resource sets" are respectively referred to as a "resource set", a "first group of resource sets", and a "second group of resource sets" for short below.

Each resource set in the first group of resource sets corresponds to (or map) one information payload range, and the information payload range refers to a range of a quantity of bits of information that can be carried on an uplink control channel resource in the resource set, where a payload size may be represented by a quantity of bits of UCI ($N_{UCI}$). Information payload ranges corresponding to resource sets in a same group of resource set do not overlap (in other words, do not have an intersection). The information payload ranges corresponding to the resource sets in the same resource set may be arranged in ascending order.

For ease of description, in this application, the quantity of bits of the UCI corresponding to the uplink information such as the feedback information and/or the A-CSI is referred to as a quantity of bits of the uplink information for short.

S402: The terminal device receives second indication information from the network device, where the second indication information is used to indicate a second group of resource sets, and the second group of resource sets includes at least one resource set.

Similar to the first group of resource sets, each resource set in the second group of resource sets corresponds to one information payload range, and information payload ranges corresponding to resource sets do not overlap and may be arranged in ascending order. Details are not described.

At least one resource set in the first group of resource sets is different from at least one resource set in the second group of resource sets. In an embodiment, that the resource sets are different may mean that resources in the resource sets are different or resources included in the resource sets are arranged in different sequences. For example, resources included in the two resource sets are completely or partially different, or resources included in the two resource sets are the same but are arranged in different sequences. Because the first set of resource sets and the second set of resource sets do not completely overlap (where there may be an intersection) or do not overlap (where there is no intersection), the first group of resource sets and the second group of resource sets may be considered as two groups of different resource sets.

In this implementation, an example in which the first group of resource sets corresponds to the feedback information and the second group of resource sets corresponds to the feedback information and the A-CSI is used for description. It may be understood that in actual application, the network device and the terminal device may agree on a specific group of resource sets corresponding to the feedback information in advance, and the other group of resource sets corresponds to the feedback information and the A-CSI. This is not limited.

There is no limitation on a sequence of performing S401 and S402. S401 may be performed before S402. Alternatively, S402 may be performed before S401. Alternatively, S401 and S402 may be simultaneously performed. This is not limited.

Optionally, in another implementation, the first indication information or the second indication information may be predefined. The terminal device may directly obtain the first indication information or the second indication information locally, and does not need to receive the first indication information or the second indication information from the network device.

Optionally, the method further includes S403: The terminal device receives third indication information, where the third indication information is used to indicate the information payload range corresponding to each resource set in the first group of resource sets.

Optionally, the method further includes S404: The terminal device receives fourth indication information, where the fourth indication information is used to indicate the information payload range corresponding to each resource set in the second group of resource sets.

The third indication information and the fourth indication information may be same indication information.

Optionally, any one of the first indication information to the fourth indication information is a higher layer parameter configured by the network device.

There is no limitation on a sequence of performing S403 and S404. S403 may be performed before S404. Alternatively, S404 may be performed before S403. Alternatively, S403 and S404 may be simultaneously performed. This is not limited. S405: The network device sends first DCI to the terminal device, where the first DCI is used to schedule first downlink data and trigger an A-CSI feedback.

The first DCI may include first timing indication information, and the first timing indication information is used to indicate that the A-CSI and feedback information that corresponds to the first downlink data are fed back in a first time unit.

S406: The network device sends second DCI to the terminal device, where the second DCI is used to schedule second downlink data.

The second DCI may include second timing indication information, and the second timing indication information is used to indicate that feedback information corresponding to the second downlink data is fed back in the first time unit.

For ease of description, the feedback information corresponding to the first downlink data is referred to as feedback information A, and the feedback information corresponding to the second downlink data is referred to as feedback information B.

It can be learned from the first DCI and the second DCI that an uplink control channel used to carry the feedback information A and an uplink control channel used to carry the A-CSI overlap in time domain.

It may be understood that the first DCI is DCI used to indicate the terminal device to feed back the A-CSI, and the second DCI is common DCI used to schedule downlink data transmission. In this embodiment, the first DCI and the second DCI are used as an example for description, and a quantity of different types of DCI is not limited. For example, there may be a plurality of pieces of DCI (the second DCI) used to schedule downlink data. In other words, the network device may send a plurality of pieces of DCI of a same type as the second DCI to the terminal device, the DCI of the same type as the second DCI is DCI used to schedule the downlink data, and feedback information corresponding to the scheduled downlink data, and the feedback information and the A-CSI that correspond to the first DCI are sent in a same time unit (for example, the first time unit). When there are a plurality of pieces of second DCI, the uplink information determined by the terminal device may include a plurality of pieces of feedback information, for example, a plurality of ACKs/NACKs, and the plurality of ACKs/NACKs may be included in a same codebook.

In this embodiment, it is assumed that the second DCI can be successfully received by the terminal, but the first DCI may not be successfully received (for example, not detected).

There is no limitation on a sequence of performing S405 and S406. S405 may be performed before S406. Alternatively, S406 may be performed before S405. Alternatively, S405 and S406 may be simultaneously performed. This is not limited. In addition, there is no limitation on a sequence of performing S405 and S406, and S401 and S402/S401 to S404. For example, the terminal device may first receive the indication information indicating the resource set, and then receive the DCI. That is, S401 and S402/S401 to S404 are first performed, and then S405 and S406 are performed.

S407: The terminal device determines the uplink information to be fed back to the network device.

The terminal device may receive the second downlink data based on the second DCI, and generate the feedback information B based on a decoding result of the second downlink data. The terminal device attempts to receive the first DCI. When the first DCI is not successfully received but the second DCI is received, the terminal device determines that the uplink information is the feedback information B, and the feedback information B may be included in a codebook. When the first DCI is successfully received, the terminal device receives the first downlink data based on the first DCI, and generates the feedback information A based on a decoding result of the first downlink data, and the terminal device determines that the uplink information includes the A-CSI. For example, the uplink information may include the A-CSI, the feedback information A, and the feedback information B. The feedback information A and the feedback information B may be included in another codebook.

S408: The terminal device determines an uplink control channel resource that carries the uplink information.

S409: The terminal device sends the uplink information to the network device on the uplink control channel resource.

The terminal device may determine, based on content of the uplink information, a group of resource sets and a resource set that correspond to the uplink information, and further determine an uplink resource in the resource set. For example, an uplink control channel resource B that carries the feedback information B belongs to a first resource set, and the first resource set belongs to the first group of resource sets. An uplink control channel resource A that carries the feedback information A, the feedback information B, and the uplink information of the A-CSI belongs to a second resource set, and the second resource set belongs to the second group of resource sets. The first resource set is different from the second resource set. In an example, the terminal device selects one resource set from each of the first group of resource sets and the second group of resource sets, and the two selected resource sets are different.

In an embodiment, when the terminal device determines that the uplink information is the feedback information B, the uplink information corresponds to the first group of resource sets. Further, the terminal device determines, in the first group of resource sets based on a quantity of bits of the feedback information B, a resource set to which the quantity of bits of the feedback information B is mapped as a target resource set. When the terminal device determines that the uplink information includes the A-CSI, the feedback information A, and the feedback information B, the uplink information corresponds to the second group of resource sets. Further, the terminal device determines, in the second group of resource sets based on a sum of quantities of bits of the feedback information A, the feedback information B, and the A-CSI or based on a sum of quantities of bits of the feedback information A, the codebook corresponding to the feedback information B, and the A-CSI, a resource set corresponding to the sum of the quantities of bits as a target resource set.

After determining the target resource set, when the terminal device latest receives the DCI based on the first DCI and the second DCI, or when the terminal device receives a plurality of pieces of DCI of a same type as the second DCI, the terminal device determines, in the target resource set based on resource indication information, for example, an ARI, in the latest received DCI, that an uplink control channel resource indicated by using the resource indication information is a resource that carries the uplink information.

In an example, the first group of resource sets is denoted as a group 1, and the second group of resource sets is denoted as a group 2. The group 1 includes three resource sets, denoted as {set 0, set 1, set 2}. An information payload range corresponding to the set 0 is [1, 2], an information payload range corresponding to the set 1 is [3, 11], and an information payload range corresponding to the set 2 is [12, 1706]. The group 2 includes three resource sets, denoted as {set 3, set 4, set 5}. An information payload range corresponding to the set 3 is [1, 2], an information payload range corresponding to the set 4 is [3, 11], and an information payload range corresponding to the set 5 is [12, 1706]. In addition, each of the set 0 to the set 5 includes eight uplink control channel resources. It is assumed that an arrangement sequence of uplink control channel resources in the set 0 is different from that of uplink control channel resources in the set 3, that is, the set 0 and the set 3 are different resource sets. When the first DCI is not successfully received, the terminal device may select a resource set from the group 1 based on the quantity of bits of the feedback information B corresponding to the second DCI. For example, assuming that the quantity of bits of the feedback information B is 4, the terminal device determines that the uplink control channel resource that carries the feedback information is selected from the set 1. When the first DCI is successfully received, the terminal device may select a resource set from the group 2 based on a sum of the quantities of bits of the feedback information A and the A-CSI that correspond to the first DCI. For example, when the sum of the quantities of bits of the feedback information A and the A-CSI is 11, the terminal device determines that the uplink control channel resource that carries the feedback information is selected from the set 4. Optionally, information payload ranges corresponding to resource sets in each group of resource sets are arranged in ascending order.

An example in which the uplink information includes the ACK/NACK and the A-CSI, and the uplink control channel is a PUCCH is used to describe how the terminal device selects a PUCCH resource to carry the uplink information. In an embodiment, the terminal device may determine, based on a codebook corresponding to the ACK/NACK, a quantity of bits of the ACK/NACK that needs to be fed back, determine the quantity of bits of the A-CSI, and then select, from a group of resource sets (for example, the second group of resource sets) corresponding to the ACK/NACK and the A-CSI, a PUCCH resource set corresponding to a sum of the quantities of bits of the ACK/NACK and the A-CSI. The PUCCH resource set may include at least eight PUCCH resources and at most 32 PUCCH resources. Further, the terminal device may determine, based on an ARI in the latest received DCI corresponding to the codebook corresponding to the ACK/NACK, a specific PUCCH resource, in the PUCCH resource set, that is used to feeds back the codebook. The PUCCH resource set may be divided into a plurality of resource subsets (subset). The ARI is used to indicate to select a specific resource subset, and a start control channel element (CCE) index of a PDCCH is used to implicitly indicate that a specific resource in the resource subset indicated by using the ARI is selected.

In this implementation, a manner of configuring or pre-defining the first group of resource sets and the second group of resource sets by a higher layer is used, so that efficiency is high and impact on a process of communication between the terminal device and the network device is small.

In an implementation, a mapping relationship (a mapping relationship A) between an information payload of the uplink information and the resource set to which the uplink control channel resource that carries the uplink information including the A-CSI belongs is different from a mapping relationship (a mapping relationship B) between the resource set to which the uplink control channel that carries the feedback information belongs and an information payload of the feedback information. The method includes the following steps.

S501: The terminal device receives first indication information from the network device, where the first indication information is used to indicate a first group of resource sets, and the first group of resource sets includes at least one resource set.

Each resource set in the first group of resource sets corresponds to one information payload range, information payload ranges corresponding to resource sets do not overlap, and information payload ranges corresponding to resource sets in a same group of resource sets may be arranged in ascending order. For details, refer to the descriptions in S401. Details are not described.

S502: The terminal device receives second indication information from the network device, where the second indication information is used to indicate a resource set (referred to as a "resource set N" below for ease of description), and the resource set N is different from any resource set in the first group of resource sets.

Optionally, in an implementation, an information payload range corresponding to the resource set N is equal to an information payload range corresponding to the last resource set in the first group of resource sets. For example, it is assumed that the first group of resource sets includes three resource sets, denoted as {set 0, set 1, set 2}. An information payload range corresponding to the set 0 is [1, 2], an information payload range corresponding to the set 1 is [3, 11], and an information payload range corresponding to the set 2 is [12, 1706]. In this case, the information payload range corresponding to the resource set N may be [12, 1706].

S502 is an optional step. When both S501 and S502 are performed, the two steps are performed in any sequence.

Optionally, the method further includes S503: The terminal device receives third indication information from the network device, where the third indication information is used to indicate the information payload range corresponding to each resource set in the first group of resource sets.

S504: The network device sends first DCI to the terminal device, where the first DCI is used to schedule first downlink data and trigger an A-CSI feedback.

The first DCI may include first timing indication information, and the first timing indication information is used to indicate that the A-CSI and feedback information that corresponds to the first downlink data are fed back in a first time unit.

S505: The network device sends second DCI to the terminal device, where the second DCI is used to schedule second downlink data.

The second DCI may include second timing indication information, and the second timing indication information is used to indicate that feedback information corresponding to the second downlink data is fed back in the first time unit.

There is no limitation on a sequence of performing S504 and S505. S504 may be performed before S505. Alternatively, S505 may be performed before S504. Alternatively, S504 and S505 may be simultaneously performed. This is not limited. In addition, there is no limitation on a sequence of performing S501, S504, and S505. Details are not described.

For more descriptions of the first DCI and the second DCI, refer to the related content in the implementation shown in FIG. 4. Details are not described.

The feedback information corresponding to the first downlink data is referred to as feedback information A, and the feedback information corresponding to the second downlink data is referred to as feedback information B.

S506: The terminal device determines the uplink information to be fed back to the network device.

When the first DCI is not successfully received, the terminal device determines that the uplink information is the feedback information B. When the first DCI is successfully received, the terminal device determines that the uplink information includes the A-CSI, for example, includes the A-CSI, the feedback information A, and the feedback information B. For a specific process of determining the uplink information, refer to the descriptions in S407. Details are not described.

S507: The terminal device determines an uplink control channel resource that carries the uplink information.

S508: The terminal device sends the uplink information to the network device on the uplink control channel resource.

In an embodiment, the uplink control channel resource that carries the feedback information B may be selected from a resource set in the first group of resource sets. The uplink control channel resource that carries the uplink information including the feedback information A, the feedback information B, and the A-CSI may be selected from a resource set in the first group of resource sets or selected from the resource set N. A mapping relationship A exists between a resource set corresponding to the uplink information including the feedback information A, the feedback information B, and the uplink information of the A-CSI and a sum of information payloads of the feedback information A, the feedback information B, and the A-CSI. A mapping relationship B exists between a resource set corresponding to the feedback information B and the information payload of the feedback information B. The mapping relationship A is different from the mapping relationship B. The information payload may be represented by using a quantity of bits.

When the terminal device determines that the uplink information is the feedback information B, the terminal device may determine, in the first group of resource sets based on a quantity of bits of the feedback information B, a resource set to which the quantity of bits of the feedback information B is mapped as a target resource set. When the terminal device determines that the uplink information includes the A-CSI, the feedback information A, and the feedback information B, the terminal device first determines, in the first group of resource sets based on a quantity of bits of a codebook B corresponding to the feedback information B, a resource set B that matches the quantity of bits of the codebook B, and determines, in the first group of resource sets based on a sum of a quantity of bits of a codebook A corresponding to the feedback information A and the feedback information B and a quantity of bits of the A-CSI, a resource set A that matches the quantity of bits of the codebook B. The resource set A and the resource set B may be the same or different.

When an information payload range corresponding to the quantity of bits of the codebook B is different from an information payload range corresponding to the sum of the quantities of bits of the A-CSI and the codebook A, the resource set B and the resource set A are different resource sets, and the terminal device may determine the resource set A as the target resource set.

A resource set corresponds to an information payload range. Therefore, even if the quantity of bits of the codebook B is different from the sum of the quantities of bits of the A-CSI and the codebook A, if the two correspond to a same information payload range, the resource set A and the resource set B may be a same resource set. In this case, the terminal device may adjust the resource set corresponding to the A-CSI and the codebook A.

In an embodiment, the terminal device may adjust the resource set to which the sum of the quantities of bits of the A-CSI and the codebook A is mapped to a resource set corresponding to a larger payload range, and the new resource set may be referred to as a resource set C. In this case, an information payload range corresponding to the resource set C is larger than the information payload range corresponding to the resource set A. The terminal device may use the resource set C as the target resource set. Optionally, the information payload range corresponding to the resource set C is the smallest one of one or more information payload ranges larger than the information payload range corresponding to the resource set A. In other words, the resource set C is a resource set with the smallest information payload range in resource sets with corresponding information payload ranges larger than that of the resource set A.

In an example, it is assumed that the first group of resource sets is { set 0, set 1, set 2, set 3}. An information payload range corresponding to the set 0 is [1, 2], an information payload range corresponding to the set 1 is [3, 11], an information payload range corresponding to the set 2 is [12, 100], and an information payload range corresponding to the set 3 is [101, 1076]. It may be understood that the information payload ranges corresponding to the set 0 to the set 3 increase in ascending order. If the terminal device determines that the uplink information is the feedback information B, and determines that the quantity of bits of the feedback information B is 3, the terminal device selects, from the set 1, the uplink control channel resource that carries the feedback information B. If the terminal device determines that the uplink information includes the A-CSI, the feedback information A, and the feedback information B, and determines that the sum of the quantities of bits of the A-CSI, the feedback information A, and the feedback information B is 11, the quantity 11 of bits may be mapped to the set 1 based on the preset mapping relationship. That is, the resource that carries the uplink information is originally selected from the set 1. To avoid that the uplink control channel resource that carries the feedback information B and the uplink control channel resource that carries the uplink information including the A-CSI are selected from a same resource set (for example, the set 1), the terminal device may adjust the mapping relationship between the quantity of bits and the resource set, to map the quantity 11 of bits to a resource set with corresponding information payload range larger than the information payload range corresponding to the set 1, for example, mapped to the set 2 or the set 3. That is, the terminal device may determine the set 2 or the set 3 as the resource set C. In this way, the terminal device selects, from the set 2 or the set 3, the uplink control channel resource to carry the uplink information including the A-CSI. Optionally, because the information payload range of the set 2 is larger than the information payload range of the set 1 and is smaller than the information payload range of the set 3, the terminal device may determine the set 2 as the resource set C. Because the information payload range of the set 2 is the smallest one of information payload ranges larger than the information payload range of the set 1, a size of the uplink control channel resource selected from the set 2 is relatively small, so that transmission resources can be saved, impact on a process of communication between the terminal device and the network device is small, and communication quality is further improved.

Optionally, when the first group of resource sets includes M resource sets (where M is a positive integer), and the resource set B is a resource set with the largest information payload range in the M resource sets with corresponding information payload ranges, the terminal device determines that the target resource set is a new resource set outside the first group of resource sets. For example, the target resource set is the resource set N. In an example, it is assumed that the first group of resource sets is { set 0, set 1, set 2}, and the resource set N is a set 3. An information payload range corresponding to the set 0 is [1, 2], an information payload range corresponding to the set 1 is [3, 11], and each of information payload ranges corresponding to the set 2 and the set 3 is [12, 1706]. If the terminal device determines that the uplink information is the feedback information B, and determines that the quantity of bits of the feedback information B is 13, the uplink control channel resource that carries the feedback information B is selected from the set 2. If the terminal device determines that the uplink information includes the A-CSI, the feedback information A, and the feedback information B, and determines that the sum of the quantities of bits of the A-CSI, the feedback information A, and the feedback information B is 25, a resource that carries the uplink information is originally selected from the set 2. However, the terminal device may adjust the mapping relationship to map the quantity 25 of bits to the set 3, and select the uplink control channel resource from the set 3 to carry the uplink information that includes the A-CSI.

After determining the target resource set, the terminal device may determine, in the target resource set based on resource indication information in DCI (namely, DCI latest received by the terminal device) latest received based on the first DCI and the second DCI, the uplink control channel resource indicated by using the resource indication information to carry the uplink information. Refer to related descriptions in the embodiments shown in FIG. 3 and FIG. 4, and details are not described.

In an implementation, the uplink control channel resource that carries the uplink information including the A-CSI and the uplink control channel resource that carries the feedback information are indicated by different DCI. The method includes the following steps.

S601: The network device sends first DCI to the terminal device, where the first DCI is used to schedule first downlink data and trigger an A-CSI feedback.

Optionally, the first DCI includes resource indication information A, and the resource indication information A is used to indicate an uplink control channel resource A.

The first DCI may further include first timing indication information, and the first timing indication information is used to indicate that the A-CSI and feedback information that corresponds to the first downlink data are fed back in a first time unit.

S602: The network device sends second DCI to the terminal device, where the second DCI is used to schedule second downlink data.

Optionally, the second DCI includes resource indication information B, and the resource indication information B is used to indicate an uplink control channel resource B.

The second DCI may further include second timing indication information, and the second timing indication information is used to indicate that feedback information corresponding to the second downlink data is fed back in the first time unit.

The first DCI and the second DCI are different DCI. In an implementation, the second DCI is sent/received after the first DCI or the second DCI and the first DCI are simultaneously sent/received. In other words, the second DCI is later than/not earlier than the first DCI. In an embodiment, in a single-carrier scenario, that the second DCI is later than/not earlier than the first DCI may mean that a second monitoring occasion in which the second DCI is located is later than/not earlier than a first monitoring occasion in which the second DCI is located. Optionally, that the second monitoring occasion is later than/not earlier than the first monitoring occasion means that a start symbol of the second monitoring occasion is later than/not earlier than a start symbol of the first monitoring occasion. In a multi-carrier scenario, that the second DCI is later than/not earlier than the first DCI may mean that a second monitoring occasion in which the second DCI is located is later than/not earlier than a first monitoring occasion in which the second DCI is located. Alternatively, when the first DCI and the second DCI are located in a same monitoring occasion, a number of a carrier on which the second DCI is located is greater than/not less than a number of a carrier on which the first DCI is located. The monitoring occasion may be, for example, a PDCCH occasion (PDCCH occasion).

For more descriptions of the first DCI and the second DCI, refer to the related content in the implementation shown in FIG. 4. Details are not described.

The feedback information corresponding to the first downlink data is referred to as feedback information A, and the feedback information corresponding to the second downlink data is referred to as feedback information B.

The resource indication information A and the resource indication information B indicate two different uplink control channel resources. The uplink control channel resource A is used to carry the uplink information including the A-CSI, and the uplink information may further include the feedback information A and/or the feedback information B. The uplink control channel resource B is used to carry the feedback information B.

Optionally, the first resource indication information A or the second resource indication information B is an ARI.

S603: The terminal device determines the uplink information to be fed back to the network device.

When the first DCI is not successfully received, the terminal device determines that the uplink information is the feedback information B. When the first DCI is successfully received, the terminal device determines that the uplink information includes the A-CSI. For a specific process of determining the uplink information, refer to the descriptions in S407. Details are not described.

S604: The terminal device determines an uplink control channel resource that carries the uplink information.

S605: The terminal device sends the uplink information to the network device on the uplink control channel resource.

In an embodiment, when the first DCI is not successfully received, the terminal device determines the uplink control channel resource B based on the resource indication information B in the second DCI. After UE successfully receives the first DCI, the terminal device determines the uplink control channel resource A based on the resource indication information A in the first DCI.

It may be understood that before or after receiving the first DCI, the terminal device may further receive one or more pieces of DCI used to schedule downlink data. For example, before receiving the first DCI, the terminal device may receive third DCI used to schedule third downlink data, and the third DCI includes third timing indication information used to indicate that third feedback information is sent in the first time unit. In this case, when the first DCI is successfully received, feedback information (referred to as feedback information C below) corresponding to the third downlink data may be jointly fed back with the A-CSI scheduled by the first DCI, and is sent on the uplink control channel resource A, and the feedback information A, the feedback information B, and the feedback information C may be included in a same codebook (codebook C). When the first DCI is not successfully received, the feedback information C may be sent on the uplink control channel resource B, and the feedback information C and the feedback information B may be included in another codebook (codebook D).

Optionally, the second DCI is the latest piece of DCI that is received by the terminal device and that corresponds to the feedback information (for example, the feedback information B and the feedback information C) carried on the uplink control channel resource B. In other words, the second DCI is the $N^{th}$ piece of DCI that is received by the terminal device based on a time sequence and/or a number of a carrier and that corresponds to the feedback information carried on the uplink control channel resource B, and the feedback information carried on the uplink control channel resource B corresponds to N pieces of DCI (where N is a positive integer). That the DCI is received based on the number of the carrier may be applicable to a multi-carrier scenario. In an embodiment, when the terminal device receives, after the first DCI, a plurality of pieces of DCI that are of a same type as the second DCI and that include the second DCI, the second DCI is the latest piece of DCI in the plurality of pieces of DCI, of this type, that are received by the terminal device, and feedback information corresponding to the plurality of pieces of DCI of the same type as the second DCI may be included in a same codebook. For example, the codebook D includes the feedback information B and the feedback information C, the feedback information B is indicated by the second DCI, the feedback information C is indicated by the third DCI, and the second DCI may be received after the third DCI.

Optionally, the uplink control channel resource that carries the A-CSI is indicated by using resource indication information in DCI latest received by the terminal device, and the control channel resource indicated by using the resource indication information is different from the foregoing uplink control channel resource that is indicated by the DCI and that carries the feedback information. In an embodiment, after receiving the first DCI, the terminal device does not expect to receive fourth DCI. The fourth DCI does not trigger the A-CSI feedback, and an uplink control channel resource used for feedback information corresponding to the fourth DCI overlaps the uplink control channel resource A in time domain. In other words, after the terminal device receives the first DCI, the uplink control channel resource used for the feedback information corresponding to the received DCI does not overlap the uplink control channel resource A in time domain. That the uplink control channel resource does not overlap the uplink control channel resource A means that the uplink control channel resource and the uplink control channel resource A do not overlap at all, or means that the uplink control channel resource and the uplink control channel resource A are not adjacent and have no intersection. In this case, the first DCI is latest DCI in pieces of DCI that are received by the terminal device and that point to a time unit in which the uplink control channel resource is located. For example, the first DCI is not earlier than the fourth DCI. Optionally, the monitoring occasion in which the first DCI is located is later than the monitoring occasion in which the fourth DCI is located. Alternatively, the monitoring occasion in which the first DCI is located is the same as a monitoring occasion in which the fourth DCI is located, and the number of the carrier on which the first DCI is located is greater than a number of a carrier on which the fourth DCI is located.

The terminal device receives and decodes DCI received after the first DCI. After decoding the received DCI, if the terminal device finds that feedback information corresponding to the DCI is sent on another uplink control channel resource (for example, the fourth DCI) that overlaps the uplink control channel resource that carries the A-CSI, the terminal device does not decode data scheduled by the DCI, does not send feedback information of the data, or sets the feedback information of the data to a NACK. For example, if a semi-persistent codebook feedback mode is configured by a higher layer, the terminal device sets the feedback information corresponding to the DCI to the NACK. When a dynamic codebook feedback mode is configured by a higher layer, the terminal device does not send the feedback information corresponding to the DCI. If the terminal device finds, after decoding the received DCI, that the uplink control channel resource on which the feedback information corresponding to the DCI is located does not overlap the uplink control channel resource that carries the A-CSI, the terminal device performs an ACK feedback/a NACK feedback according to a normal procedure.

In another implementation, there is no limitation on a sequence of sending/receiving the first DCI and the second DCI. In other words, there is no limitation on a sequence of performing S601 and S602. In this implementation, when the first DCI is not successfully received, the terminal device determines that the uplink information is the feedback information B. When the first DCI is successfully received, the terminal device determines that the uplink information includes the A-CSI, for example, includes the A-CSI and the feedback information A. When the first DCI is successfully received, the terminal device may determine the uplink control channel resource A based on the resource indication information A in the first DCI, send, on the uplink control channel resource A, a codebook E corresponding to the feedback information A and the A-CSI, and send, on the uplink control channel resource B, a codebook F corresponding to the feedback information B. In addition, the codebook E does not include the feedback information B, and the codebook F does not include the feedback information A. When the first DCI is not successfully received, the terminal device may determine the uplink control channel resource B based on the resource indication information B in the second DCI, and send, on the uplink control channel resource B, the codebook F corresponding to the feedback information B. The codebook F does not include the feedback information A. When the codebook F is a semi-persistent codebook, a bit position that is in the codebook B and that corresponds to the feedback information A may be set to a NACK. When the codebook F is a dynamic codebook, the first DCI may be skipped during DAI counting, to save resources. In this implementation, the network device separately indicates the uplink control channel resource for the uplink information that includes the A-CSI, and the terminal device determines that the uplink information is not jointly transmitted with feedback information corresponding to DCI other than the DCI that triggers the A-CSI. Therefore, the network device side does not misunderstand the quantity of bits of the uplink information, so that the uplink information can be correctly received.

In an implementation, for DCI sent after the DCI (the first DCI) that triggers the A-CSI, even if the DCI does not trigger the A-CSI, a CSI request field in the DCI may be enabled to trigger an A-CSI report that is the same as that in the first DCI. The method includes the following steps.

S701: The network device sends first DCI to the terminal device, where the first DCI is used to schedule first downlink data and trigger an A-CSI feedback.

The first DCI may be used to indicate the terminal device to send an A-CSI report to the network device.

The first DCI may include first timing indication information, used to indicate that the A-CSI and feedback information that corresponds to the first downlink data are fed back in a first time unit. The first DCI may further include resource indication information A, used to indicate an uplink control channel resource A.

S702: The network device sends second DCI to the terminal device, where the second DCI is used to schedule second downlink data and indicate the terminal device to send the A-CSI report.

The second DCI includes second timing indication information, used to indicate that the A-CSI and feedback information corresponding to the second downlink data are fed back in the first time unit. The second DCI may further include resource indication information B, used to indicate an uplink control channel resource B.

The second DCI is sent later than the first DCI.

The second DCI may be used to indicate the terminal device to jointly send the feedback information of the second downlink data and the A-CSI report. Optionally, the A-CSI report may be triggered by using a CSI field in the first DCI or the second DCI, and the CSI field may be a CSI request field. The CSI request field may be a plurality of bits, and different values may indicate different A-CSI reports. For example, CSI request=00 indicates that the A-CSI report is not triggered, and CSI request=01 indicates that the A-CSI report is triggered.

In this implementation, after the second DCI is sent, any DCI sent by the network device either triggers the A-CSI report, or corresponding feedback information is not fed back in the first time unit. In other words, an uplink control channel used for feedback information corresponding to other DCI does not overlap the uplink control channel used for A-CSI.

For more descriptions of the first DCI and the second DCI, refer to the related content in the implementation shown in FIG. 4. Details are not described.

S703: The terminal device determines the uplink information to be fed back to the network device.

The terminal device attempts to receive the first DCI and the second DCI. When the first DCI is successfully received, the terminal device may ignore the A-CSI report triggered by the second DCI, and specific content of the uplink information may be determined based on DCI latest received by the terminal device. For example, if the second DCI is successfully received, the uplink information is determined based on the second DCI. If the second DCI fails to be received, the uplink information is determined based on the first DCI.

In an embodiment, when the first DCI is successfully received but the second DCI fails to be received, the terminal device may determine, based on the first DCI, to send the A-CSI report in the first time unit. The uplink information may include the A-CSI and the feedback information corresponding to the first DCI. When both the first DCI and the second DCI are successfully received, the terminal device may determine, based on the first DCI, to send the A-CSI report in the first time unit. The uplink information may include the A-CSI, the feedback information corresponding to the first DCI, and the feedback information corresponding to the second DCI.

When the first DCI fails to be received but the second DCI is successfully received, the terminal device may determine, based on the second DCI, to send the A-CSI report in the first time unit. In this case, the uplink information may include the A-CSI and the feedback information corresponding to the second DCI.

When both the first DCI and the second DCI fail to be received, the terminal device may determine that the uplink information includes feedback information corresponding to third DCI that is received before the first DCI. The third DCI is used to schedule third downlink data, and the third DCI may include third timing indication information, used to indicate that feedback information corresponding to the third downlink data is fed back in the first time unit. The third DCI may further include third resource indication information used to indicate an uplink control channel resource C, and the uplink control channel resource C is different from the uplink control channel resource A or the uplink control channel resource B. Optionally, a monitoring occasion in which the first DCI is located is later than a monitoring occasion in which the third DCI is located.

S704: The terminal device determines an uplink control channel resource that carries the uplink information.

S705: The terminal device sends the uplink information to the network device on the uplink control channel resource.

In an embodiment, when the first DCI is successfully received but the second DCI is not successfully received, the terminal device may determine the uplink control channel resource A based on the resource indication information A, and send, on the uplink control channel resource A, the A-CSI and a codebook G including the feedback information corresponding to the first DCI.

When the second DCI is successfully received, the terminal device may determine the uplink control channel resource B based on the resource indication information B, and send, on the uplink control channel resource B, the A-CSI and a codebook H including the feedback information corresponding to the second DCI.

When neither the first DCI nor the second DCI is successfully received, the terminal device may determine the uplink control channel resource C based on other received DCI, for example, the third resource indication information in the third DCI, and send, on the uplink control channel resource C, a codebook I including the feedback information corresponding to the third DCI.

For a semi-persistent codebook, quantities of bits of the codebook G, the codebook H, and the codebook I are the same. For a dynamic codebook, quantities of bits of the codebook G, the codebook H, and the codebook I are different.

Optionally, in a multi-carrier scenario, the terminal device may feed back only the A-CSI on a primary carrier, and all A-CSI reports triggered on other secondary carriers are used as duplications of the A-CSI report triggered on the primary carrier.

By using the manner of repeatedly triggering the A-CSI report in this implementation, a probability that the terminal device successfully receives the DCI that triggers the A-CSI can be improved, and an error in receiving, by the network device, the A-CSI and the feedback information that are jointly fed back can be avoided. This implementation may be combined with any one of the implementations shown in FIG. 3 to FIG. 6, or may be separately implemented. That is, in this implementation, the uplink control channel resource that carries the uplink information including the A-CSI may be different from or the same as the uplink control channel resource that carries feedback information. This is not limited.

For brevity of description, the foregoing implementations shown in FIG. 4 to FIG. 7 mainly describe processes of determining and sending the uplink information. For a process of receiving the uplink information by the network device, refer to related descriptions in the embodiment shown in FIG. 3, for example, steps S304 and S305. Details are not described.

The foregoing implementations shown in FIG. 4 to FIG. 7 are described by using joint feedbacks as an example, as shown in a scenario in FIG. 2(a). In the separate feedback scenario shown in FIG. 2(b), the terminal device also receives the DCI used to trigger the A-CSI and schedule the downlink data. When the uplink control channel that carries the A-CSI and the uplink control channel used for feedback information corresponding to DCI other than the DCI that triggers the A-CSI overlap in time domain, the terminal device needs to jointly feed back the A-CSI and the feedback information corresponding to the other DCI, as shown in FIG. 2(a). A difference between the scenario in FIG. 2(b) and the scenario in FIG. 2(a) lies in that the feedback information corresponding to the DCI that triggers A-CSI and the A-CSI are not sent on a same uplink control channel resource. Therefore, the communication method provided in this embodiment is also applicable to the scenario shown in FIG. 2(b). For example, in the implementation shown in FIG. 4, if the terminal device does not successfully receive the DCI that triggers the A-CSI, the terminal device may determine, by using a group of resource sets, the uplink control channel resource that is used to carry only the feedback information B. If the terminal device successfully receives the DCI that triggers the A-CSI, another group of uplink control channel resource sets is used to determine the uplink control channel resource that carries the feedback information B and the A-CSI. In addition, at least one resource set in the two groups of resource sets is different. For details, refer to the descriptions in the implementation shown in FIG. 4, and a difference lies in that, in the scenario shown in FIG. 2(b), the feedback information A, namely, the feedback information corresponding to DCI that triggers A-CSI, and the A-CSI are not located on a same uplink control channel resource. Details are not described. In addition, other implementations, for example, the implementations shown in FIG. 5 to FIG. 7, may also be applicable to the foregoing separate feedback scenario. A specific implementation is similar to that in the joint feedback scenario. Details are not described.

The uplink control channel that carries the A-CSI may overlap the uplink control channel that carries the feedback information (for example, an ACK/a NACK), and may also overlap an uplink data channel. When the uplink control channel that carries the A-CSI overlaps the uplink data channel, the terminal device may carry (piggyback) the A-CSI on the uplink data channel and transmit the A-CSI in a rate matching (rate-match) manner. However, if the terminal device does not successfully receive the DCI indicating the A-CSI, for example, misses detecting the DCI, the terminal device actually does not transmit the A-CSI on the uplink data channel, but the network device still receives the A-CSI based on a case in which the A-CSI is carried on the uplink data channel. Consequently, the network device incorrectly estimates a resource position of the uplink data, and a data receiving problem occurs. The resource may be a resource element (resource element, RE), and the resource position may be a position of the RE in time domain and frequency domain.

Figure 8:
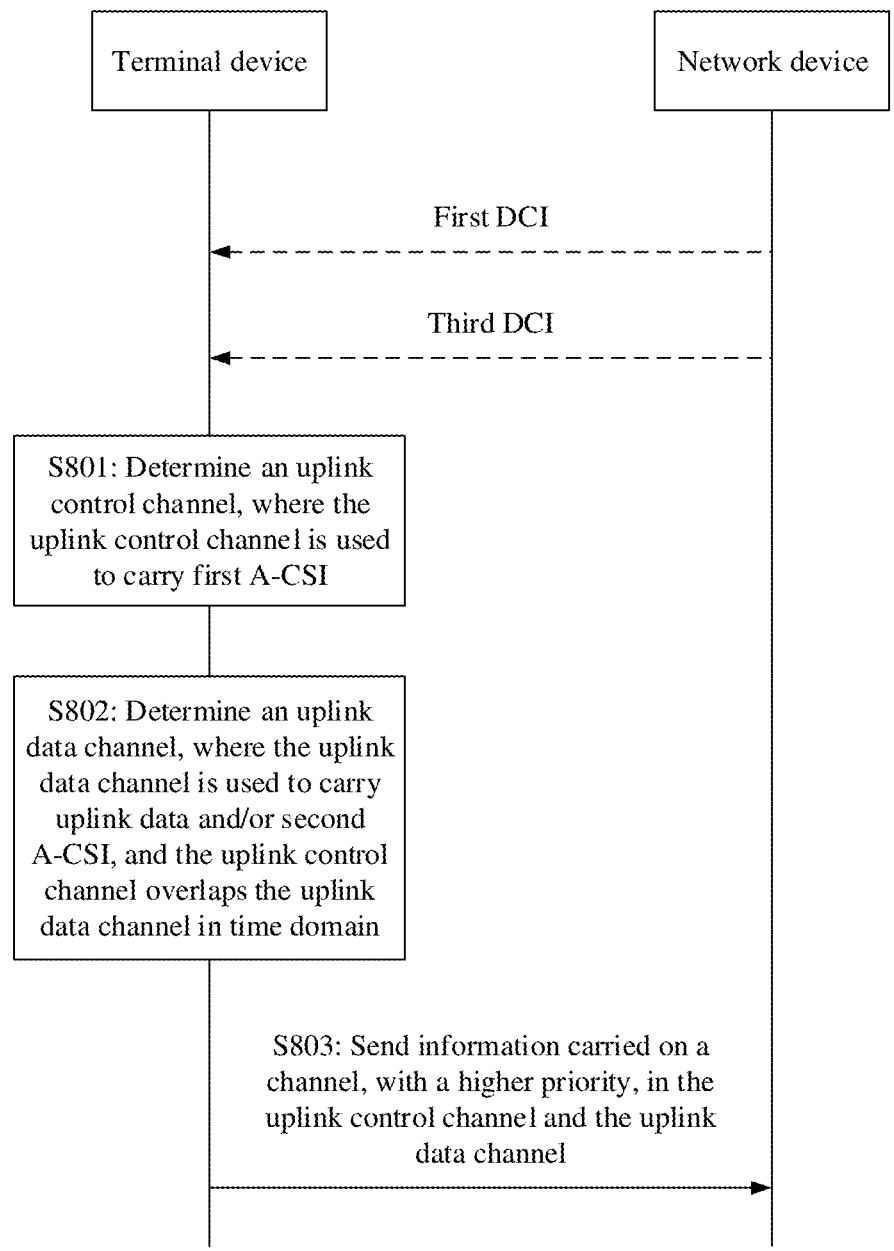
FIG. 8 is a schematic flowchart of a communication method according to an embodiment.

To resolve the foregoing problem, an embodiment provides a communication method, so that when the uplink control channel that carries the A-CSI overlaps the uplink data channel, the network device can correctly receive the uplink data. FIG. 8 is a schematic flowchart of a communication method according to an embodiment. The method includes the following steps.

S801: A terminal device determines an uplink control channel, where the uplink control channel is used to carry first A-CSI.

The uplink control channel may be a PUCCH or another control channel used to carry uplink information. This is not limited.

Optionally, the terminal device receives first DCI, where the first DCI is used to indicate the terminal device to send the first A-CSI on the uplink control channel, and the first DCI may be further used to schedule downlink data. For detailed descriptions of the first DCI, refer to related descriptions in other embodiments. Details are not described.

S802: The terminal device determines an uplink data channel, where the uplink data channel is used to carry uplink data and/or second A-CSI, and the uplink control channel overlaps the uplink data channel in time domain.

The uplink data channel may be a physical uplink shared channel (physical uplink shared channel, PUSCH) or a channel used to send the uplink data. This is not limited. The uplink data channel may be dynamic or configured. The dynamic uplink data channel may also be referred to as a dynamically scheduled uplink data channel, for example, may be scheduled by second DCI received by the terminal. Optionally, the second DCI may be further used to indicate to send the second A-CSI on the uplink data channel. In addition, the configured uplink data channel includes different types. For example, the uplink data channel is a PUSCH. The configured PUSCH may be a type 1 (Type 1), namely, a grant-free PUSCH (GF PUSCH), or a type 2 (Type 2), namely, a semi-persistent scheduling PUSCH (SPS PUSCH).

That the uplink control channel overlaps the uplink data channel in time domain may mean that the first A-CSI and the uplink data and/or the second A-CSI are/is sent in a same time unit.

It may be understood that there is no limitation on a sequence of performing S801 and S802. S801 may be performed before S802. Alternatively, S802 may be performed before S801. Alternatively, S801 and S802 may be simultaneously performed. This is not limited.

S803: The terminal device sends information carried on a channel, with a higher priority, in the uplink control channel and the uplink data channel.

The priority may be a priority of information carried on a sending channel. In other words, the terminal device may mute a channel with a lower priority based on the priorities of the channel, and this includes stopping sending, in an overlapped time unit, information carried on the muted channel, or completely stopping sending information carried on the muted channel.

In the following, that the uplink control channel is the PUCCH and the uplink data channel is the PUSCH is used as an example to list several manners of determining a priority sequence of the uplink control channel and the uplink data channel (refer to the following manner 1 to manner 5). It may be understood that the following several manners are merely examples, and a manner of determining the priority sequence is not limited in this embodiment.

Manner 1: The priority sequence is preset and fixed. For example, a priority of the PUCCH is preset to be higher than a priority of the PUSCH. Alternatively, a priority of the PUSCH is preset to be higher than a priority of the PUCCH.

Manner 2: The priority sequence is configured by a higher layer. For example, higher layer signaling is used to indicate that the priority of the PUCCH is higher than the priority of the PUSCH. Alternatively, the higher layer signaling is used to indicate that the priority of the PUSCH is higher than the priority of the PUCCH.

Manner 3: The priority sequence is determined based on a type of a service of information carried on a channel.

In an implementation, a priority of a channel that carries information about a high-priority service is high. In an example, a priority of an emergency service such as a URLLC service is higher than a priority of a non-emergency service such as an enhanced mobile broadband (eMBB) service. Optionally, when the PUSCH carries URLLC service data, the priority of the PUSCH is higher than the priority of the PUCCH. When the PUSCH carries eMBB service data, the priority of the PUCCH is higher than the priority of the PUSCH. Optionally, when the PUCCH carries A-CSI corresponding to the URLLC service, the priority of the PUCCH is higher than the priority of the PUSCH. When the PUCCH carries A-CSI corresponding to the eMBB service, if the PUSCH carries the URLLC service data, the priority of the PUSCH is higher than the priority of the PUCCH; or if the PUSCH carries the eMBB service data, the priority of the PUCCH is higher than the priority of the PUSCH.

The type of the service carried on the PUSCH may be determined in a plurality of manners such as a DCI indication manner or a semi-static configuration manner. This is not limited. For example, for a dynamic PUSCH, a type of a service on the PUSCH may be determined based on a DCI indication. In an embodiment, a specific service carried on the PUSCH may be determined based on indication information in DCI that schedules the PUSCH. The indication information may be a radio network temporary identifier (RNTI) in the DCI or DCI format information, or may be set indication information. This is not limited. For another example, for a dynamic PUSCH or a configured PUSCH, a type of a service on the PUSCH may be determined in a semi-static configuration manner. In an embodiment, a specific service carried on the PUSCH is determined based on a modulation and coding scheme table (MCS-table) associated with the PUSCH or an SLIV or K1 associated with the PUSCH. The specific service may be a URLLC service or an eMBB service.

Similarly, the type of the service that is carried on the PUCCH and that corresponds to the A-CSI may also be determined in a plurality of manners such as a DCI indication manner or a semi-static configuration manner. This is not limited. For example, a specific service corresponding to the A-CSI may be determined based on the indication information in the DCI that triggers the A-CSI. The indication information may be the RNTI or the DCI format information in the DCI, or may be the specially set indication information. This is not limited. For another example, a specific service corresponding to the A-CSI may be determined based on a channel quality indicator table (CQI table) associated with the A-CSI. The specific service may be a URLLC service or an eMBB service.

Manner 4: The priority sequence is determined based on a feature of a channel.

The feature of the channel includes whether a PUSCH is configured or dynamic, a sequence of scheduling/triggering a PUSCH and a PUCCH, or a sequence of a start symbol of a PUCCH and a start symbol of a PUSCH.

In an implementation, when the PUSCH is the configured PUSCH, the priority of the PUCCH is higher than the priority of the PUSCH.

In an implementation, when the PUSCH is the dynamic PUSCH, a priority of a channel scheduled/triggered later is higher. For example, if the DCI that triggers the A-CSI is received after the DCI that schedules the PUSCH, the priority of the PUCCH that carries the A-CSI is higher than the priority of the PUSCH. If the DCI that triggers the A-CSI is received before the DCI that schedules the PUSCH, the priority of the PUSCH is higher than the priority of the PUCCH that carries the A-CSI. If the two types of DCI are received at the same time, the terminal device may directly use the PUSCH to carry the A-CSI, or set the priority of the PUCCH that carries the A-CSI to be higher, or configure, by a higher layer, a channel that is preferentially sent. This is not limited. That the DCI that triggers the A-CSI is after the DCI that schedules the PUSCH may mean that a sending moment of a PDCCH corresponding to the PUCCH is later than a sending moment of a PDCCH corresponding to the PUSCH. That the DCI that triggers the A-CSI is before the DCI that schedules the PUSCH may mean that a sending moment of a PDCCH corresponding to the PUCCH is earlier than a sending moment of a PDCCH corresponding to the PUSCH. In another possible manner, the terminal device does not expect to receive scheduling DCI of the A-CSI and scheduling DCI of the PUSCH at a same moment.

The foregoing sending moment of the PDCCH may be the first time unit or the latest time unit of the PDCCH, for example, may be the first symbol or the latest symbol of the PDCCH.

In an implementation, in the PUCCH and the PUSCH, a channel with a start symbol earlier has a higher priority, or a channel with a start symbol later has a higher priority.

In the foregoing implementation, when the uplink data channel overlaps the uplink control channel that carries the A-CSI in time domain, the terminal device sends information carried on the channel with the higher priority, and mutes the channel with the lower priority, so that the uplink data can be correctly received, especially in a scenario in which the terminal device does not successfully receive the DCI indicating that the A-CSI is triggered, and data receiving accuracy can be improved.

In addition to muting one of the uplink control channel and the uplink data channel that overlap in time domain based on the priorities, to avoid a receiving error of the network device, in another implementation, the terminal device may further separately obtain, from different DCI, indication information that is used to indicate the terminal device to send a same A-CSI report on the uplink control channel and the uplink data channel that overlap in time domain. The A-CSI report may be the A-CSI that is configured by the higher layer and that is carried on the uplink control channel.

In an embodiment, the method may include: After or when the terminal device receives the DCI (for example, the first DCI) used to indicate the terminal device to send the A-CSI on the uplink control channel (in other words, the first DCI is not received later than the third DCI), the terminal device further receives one or more pieces of third DCI from the network device, where the third DCI is used to schedule the terminal device to send uplink data on an uplink data channel, the third DCI includes indication information, and the indication information is used to indicate the terminal device to send the A-CSI on the uplink data channel. Correspondingly, the terminal device may send the uplink data and the A-CSI on the uplink data channel based on the indication information.

The A-CSI may also be referred to as an A-CSI report. The first DCI and the third DCI each send an A-CSI request, where the A-CSI request is used to trigger the terminal device to send the A-CSI report.

The first DCI may be further used to schedule downlink data transmission. Details are not described.

The indication information may be a preset value in a bit field in the third DCI, and the bit field may be existing or specially set. This is not limited. The following describes several setting manners of the bit field of the indication information by using an example in which the uplink control channel is a PUCCH and the uplink data channel is a PUSCH.

In an implementation, the bit field is specially set for triggering the A-CSI report. For example, a bit field may be added to the third DCI. A preset value in the newly added bit field is used to indicate that the network device has scheduled one piece of A-CSI to be sent on the PUCCH, and the PUCCH that carries the A-CSI overlaps the PUSCH. Therefore, a corresponding PUCCH may need to be muted, and the A-CSI is carried on the PUSCH. When UE misses detection of the DCI that triggers the A-CSI carried on the PUCCH, a corresponding resource position may be reserved on the PUSCH, so that a resource position for data transmission is correct. Optionally, the bit field may be further used to indicate a quantity of bits of the A-CSI. Alternatively, the A-CSI corresponds to a report identifier (report identity, report ID). Because different A-CSI reports correspond to different sizes of information content, the quantity of bits of the A-CSI may be obtained by using the report identifier.

In an implementation, an existing bit field in the third DCI may be reused, a preset value in the existing bit field is used to indicate that the network device has scheduled one piece of A-CSI to be sent on the PUCCH, and the PUCCH that carries the A-CSI overlaps the PUSCH. Therefore, the A-CSI may also be carried on the PUSCH. For example, a CSI-request bit field in the DCI may be reused, the CSI-request bit field is set to a preset value, and the preset value is used to trigger A-CSI corresponding to a same report ID as the A-CSI sent on the PUCCH. In an embodiment, the preset value may be associated with an A-CSI report corresponding to the A-CSI. The CSI-request bit field may be 2 bits or 3 bits.

Optionally, when the PUSCH overlaps the PUCCH that carries the A-CSI in time domain, and the A-CSI carried on the PUSCH and the A-CSI carried on the PUCCH correspond to different report IDs, information on a channel with a higher priority may be sent based on priorities of the PUSCH and the PUCCH. For example, priorities of types of services of information carried on the two channels may be considered, and a priority of the channel that carries an emergency service is higher. For example, the PUCCH carries the A-CSI corresponding to a URLLC service, and DCI indicating the A-CSI is received after the DCI that schedules the PUSCH. In this case, the A-CSI may be preferentially sent. For more specific manners of determining the priorities, refer to the foregoing related descriptions. Details are not described.

In this implementation, the terminal device may separately receive a plurality of (two or more) A-CSI requests, and the plurality of A-CSI requests are used to separately trigger the terminal device to send, in a time unit, a same A-CSI report on an uplink control channel and an uplink data channel that overlap, thereby improving a success rate of sending the A-CSI by the terminal device, and avoiding an uplink data receiving error.

In another possible implementation, when the first DCI is received no later than the third DCI, the third DCI includes the indication information by using the foregoing method, where the indication information is used to indicate the terminal device to send, on the uplink data channel, the A-CSI triggered by the first DCI. When the first DCI is later than the third DCI, the A-CSI may be preferentially sent to mute the uplink data channel.

In another possible implementation, the terminal device may not process the received DCI that indicates that the A-CSI overlaps the uplink data channel. In other words, the terminal device does not expect to receive the A-CSI that is triggered by the DCI and that is sent by overlapping the uplink data channel. In another implementation, the network device may not schedule the A-CSI sent on the uplink control channel to overlap another uplink data channel in time domain. The uplink data channel may be scheduled or configured. This is not limited. Therefore, in this implementation, the terminal device may not send the uplink control channel that carries the A-CSI and that overlaps the uplink data channel in time domain. In other words, the uplink control channel used to send the A-CSI does not overlap the uplink data channel. Therefore, an uplink data receiving error can be avoided.

The foregoing describes in detail examples of the communication method according to this application. It can be understood that, to implement the foregoing functions, a communication apparatus includes a corresponding hardware structure and/or software module for performing the functions. A person of ordinary skill in the art should easily be aware that, in combination with units and algorithm steps of the examples described in the embodiments, the embodiments may be implemented by hardware or a combination of hardware and computer software. Whether a function is performed by hardware or hardware driven by computer software depends on particular applications and design constraints of the technical solutions. A person of ordinary skill in the art may use different methods to implement the described functions for each particular embodiment, but it should not be considered that the implementation goes beyond the scope of the embodiments.

In this application, the communications apparatus may be divided into functional units based on the foregoing method examples. For example, each functional unit may be obtained through division based on a corresponding function, or two or more functions may be integrated into one processing unit. The integrated unit may be implemented in a form of hardware, or may be implemented in a form of a software functional unit. It should be noted that, division into units in this application is an example, and is merely logical function division. During actual implementation, another division manner may be used.

Figure 9:
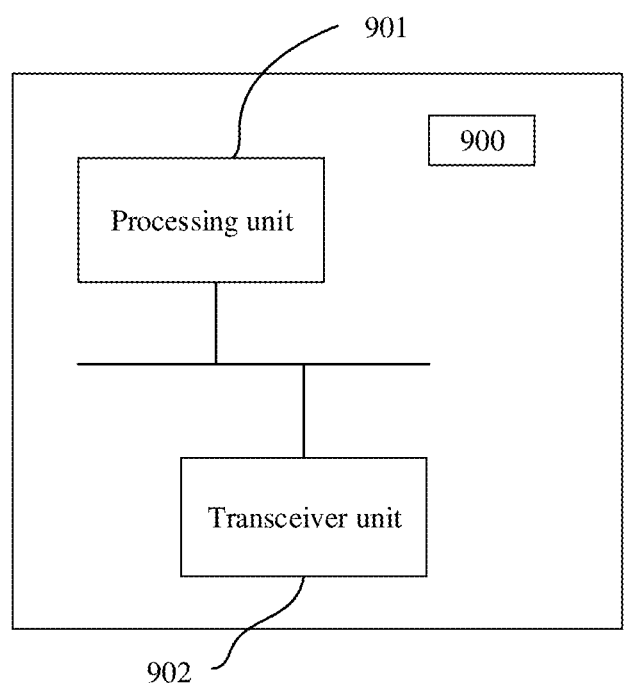
FIG. 9 is a schematic structural diagram of a communications apparatus 900 according to an embodiment.

For example, a communications apparatus 900 shown in FIG. 9 includes a processing unit 901 and a transceiver unit 902.

In an implementation, the communications apparatus 900 is configured to support a terminal device in implementing the communication method provided in the embodiments. For example, the processing unit 901 may be configured to: determine uplink information; when the uplink information is first feedback information, determine a first uplink control channel resource corresponding to the first feedback information; or when the uplink information includes A-CSI, determine a second uplink control channel resource corresponding to the uplink information, where the first uplink control channel resource is different from the second uplink control channel resource. The transceiver unit 902 may be configured to send the first feedback information on the first uplink control channel resource or send the uplink information on the second uplink control channel resource.

The uplink information may include the A-CSI and second feedback information, and the second feedback information and the A-CSI may be indicated by same DCI. The sending unit 902 may be configured to: send the A-CSI on the second uplink control channel resource; or send the A-CSI, the first feedback information, and the second feedback information on the second uplink control channel resource; or send the A-CSI and the first feedback information on the second uplink control channel resource.

Optionally, the transceiver unit 902 is further configured to receive first indication information, where the first indication information is used to indicate a first group of uplink control channel resource sets, and the first group of uplink control channel resource sets includes at least one uplink control channel resource set; and receive second indication information, where the second indication information is used to indicate a second group of uplink control channel resource sets, and the second group of uplink control channel resource sets includes at least one uplink control channel resource set, where at least one uplink control channel resource set in the first group of uplink control channel resource sets is different from at least one uplink control channel resource set in the second group of uplink control channel resource sets.

Optionally, the first uplink control channel resource belongs to a first uplink control channel resource set, and the first uplink control channel resource set belongs to the first group of uplink control channel resource sets; and the second uplink control channel resource belongs to a second uplink control channel resource set, and the second uplink control channel resource set belongs to the second group of uplink control channel resource sets, where the first uplink control channel resource set is different from the second uplink control channel resource set.

Optionally, the first uplink control channel resource belongs to a third uplink control channel resource set, the third uplink control channel resource set belongs to the first group of uplink control channel resource sets, and there is a first mapping relationship between the third uplink control channel resource set and an information payload of the first feedback information; and the second uplink control channel resource belongs to a fourth uplink control channel resource set, the fourth uplink control channel resource set belongs to the first group of uplink control channel resource sets or the second group of uplink control channel resource sets, and there is a second mapping relationship between the fourth uplink control channel resource set and a sum of an information payload of the A-CSI and an information payload of the feedback information (for example, the second feedback information) sent on the second uplink control channel resource, where the first mapping relationship is different from the second mapping relationship. In a possible implementation, when the fourth uplink control channel resource set belongs to the first group of uplink control channel resource sets, an information payload range corresponding to the fourth uplink control channel resource set is the smallest one of one or more information payload ranges larger than an information payload range corresponding to the third uplink control channel resource set.

For detailed descriptions of the foregoing content such as the resource set, the resource set group, and the mapping relationship between the resource set and the information payload, refer to the related descriptions in the embodiments shown in FIG. 3 to FIG. 6. Details are not described.

Optionally, the processing unit 901 is configured to: determine the first uplink control channel resource based on first resource indication information; and determine the second uplink control channel resource based on second resource indication information, where the first resource indication information and the second resource indication information are included in different DCI. For example, the second resource indication information is included in first DCI, and the first DCI corresponds to the A-CSI; and the first resource indication information is included in second DCI, the second DCI is the $N^{th}$ piece of DCI that is received by the terminal device in a time sequence and that corresponds to the first feedback information, and the first feedback information corresponds to N pieces of DCI (where N is a positive integer).

Optionally, the processing unit 901 may receive third DCI after receiving the first DCI, where the third DCI is used to indicate the terminal device to send third feedback information, and a third uplink control channel resource that carries the third feedback information does not overlap the second uplink control channel resource.

For specific content of the first DCI, the second DCI, the third DCI, and information included in each piece of DCI, refer to the related descriptions in the embodiments shown in FIG. 3 to FIG. 6. Details are not described.

Optionally, the transceiver unit 902 is further configured to receive fourth DCI, where the fourth DCI is received after DCI (for example, the first DCI) that triggers the A-CSI, and the fourth DCI is used to indicate the terminal device to send an A-CSI report corresponding to the A-CSI. The processing unit 901 may be configured to determine, based on the received first DCI and the received fourth DCI, the uplink information and the uplink control channel resource used by the uplink information. For descriptions of the A-CSI report, refer to the related content in the embodiment shown in FIG. 7. Details are not described.

Optionally, the processing unit 902 is further configured to determine that the second uplink control channel resource is used to carry only the A-CSI or carry the A-CSI and the feedback information corresponding to the DCI that triggers the A-CSI. In other words, the processing unit 902 is configured to determine that the uplink information is not jointly transmitted with feedback information corresponding to DCI other than the DCI that triggers the A-CSI.

Optionally, the processing unit 901 is further configured to determine an uplink data channel, where the uplink data channel is used to carry uplink data and/or second A-CSI, and overlaps, in time domain, the uplink data channel resource and the uplink control channel (for example, the second uplink control channel) that carries the A-CSI. In addition, the processing unit 901 is configured to: determine a priority sequence of the uplink data channel and the uplink control channel that carries the A-CSI, and send, through the transceiver unit 902, information carried on a channel with a higher priority. For a manner of determining the priority sequence, refer to the descriptions in the embodiment shown in FIG. 8. Details are not described.

Optionally, the transceiver unit 902 is further configured to: after or when receiving the DCI used to indicate the terminal device to send the A-CSI on the uplink control channel, receive, from a network device, one or more pieces of DCI used to schedule the terminal device to send the uplink data on the uplink data channel, where the one or more pieces of DCI include indication information, and the indication information is used to indicate the terminal device to send the A-CSI on the uplink data channel. For a specific setting manner of the indication information, refer to the descriptions in the embodiment shown in FIG. 8. Details are not described.

In an implementation, the communications apparatus 900 is configured to support a network device in implementing the communication method provided in the embodiments. For example, the processing unit 901 may be configured to: determine an uplink control resource used by uplink information sent by a terminal device; when the uplink information is received on a first uplink control channel resource, determine that the uplink information is first feedback information; or when the uplink information is received on a second uplink control channel resource, determine that the uplink information includes A-CSI, where the first uplink control channel resource is different from the second uplink control channel resource; and receive the uplink information through the transceiver unit 902. It may be understood that when the communications apparatus 900 supports the network device in implementing the communication method provided in this application, functions or operations are the same as or correspond to those on the terminal device side. Details are not described.

Optionally, the transceiver unit 902 is further configured to send first indication information to the terminal device, where the first indication information is used to indicate a first group of uplink control channel resource sets, and the first group of uplink control channel resource sets includes at least one uplink control channel resource set; and send second indication information to the terminal device, where the second indication information is used to indicate a second group of uplink control channel resource sets, and the second group of uplink control channel resource sets includes at least one uplink control channel resource set, where at least one uplink control channel resource set in the first group of uplink control channel resource sets is different from at least one uplink control channel resource set in the second group of uplink control channel resource sets.

Optionally, the transceiver unit 902 is further configured to send first resource indication information to the terminal device, where the first resource indication information is used to determine the first uplink control channel resource; and send second resource indication information to the terminal device, where the second resource indication information is used to determine the second uplink control channel resource, where the first resource indication information and the second resource indication information are included in two pieces of different DCI.

Optionally, the transceiver unit 902 is further configured to: after sending DCI (for example, the first DCI) that triggers the A-CSI, send, to the terminal device, DCI (for example, the fourth DCI) used to indicate the terminal device to send the A-CSI report corresponding to the A-CSI.

Optionally, the transceiver unit 902 is further configured to: after or when sending the DCI that indicates the terminal device to send the A-CSI on the uplink control channel, send one or more pieces of DCI used to schedule the terminal device to send the uplink data on the uplink data channel, where the one or more pieces of DCI include indication information, and the indication information is used to indicate the terminal device to send the A-CSI on the uplink data channel.

For detailed descriptions of operations performed by the functional units of the communications apparatus 900, for example, specific manners of determining the first uplink control channel resource and the second uplink control channel resource, refer to the embodiments of the communication method provided in this application, for example, the related content in the embodiments shown in FIG. 2 to FIG. 8. Details are not described.

In another implementation, during hardware implementation, a processor may perform a function of the processing unit 901, and a transceiver (a transmitter/receiver) may perform a function of the transceiver unit 902. The processing unit 901 may be built in or independent of a processor of a base station in a hardware form, or may be stored in a memory of the base station in a software form, so that the processor invokes and performs an operation corresponding to each of the foregoing modules.

Figure 10:
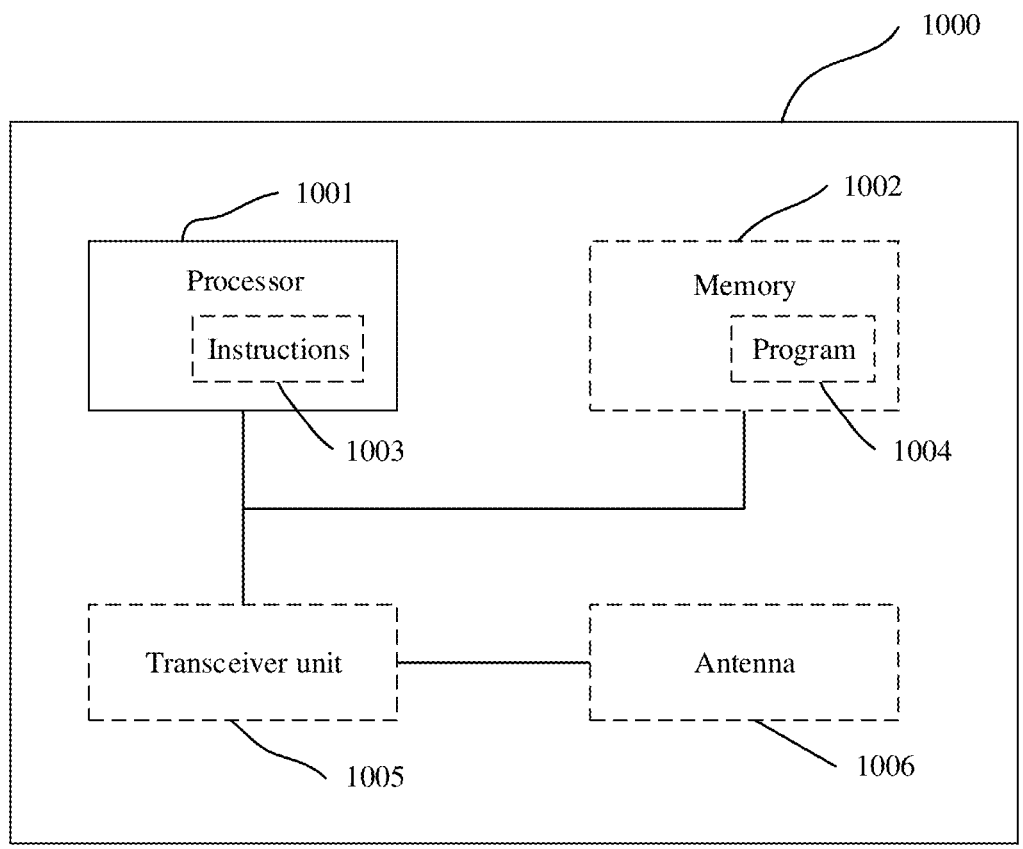
FIG. 10 is a schematic structural diagram of a communications apparatus 1000 according to an embodiment.

FIG. 10 is a schematic structural diagram of a communications apparatus 1000 according to this application. The communications apparatus 1000 may be configured to implement the methods described in the foregoing method embodiments. The communications apparatus 1000 may be a chip, a terminal device, a network device, another wireless communications device, or the like.

The communications apparatus 1000 includes one or more processors 1001. The one or more processors 1001 may support the communications apparatus 1000 in implementing the communication method performed by the terminal device in the embodiments, for example, the method performed by the terminal device in the embodiments shown in FIG. 3 to FIG. 8. Alternatively, the one or more processors 1001 may support the communications apparatus 1000 in implementing the method performed by the network device in the embodiments, for example, the method performed by the network device in the embodiments shown in FIG. 3 to FIG. 8.

The processor 1001 may be a general-purpose processor or a special-purpose processor. For example, the processor 1001 may include a central processing unit (CPU) and/or a baseband processor. The baseband processor may be configured to process communication data (for example, the first message described above), and the CPU may be configured to implement corresponding control and processing functions, execute a software program, and process data of the software program.

Further, the communications apparatus 1000 may include a transceiver unit 1005, configured to input (receive) and output (send) a signal.

For example, the communications apparatus 1000 may be a chip, and the transceiver unit 1005 may be an input and/or output circuit of the chip. Alternatively, the transceiver unit 1005 may be a communications interface of the chip, and the chip may be used as a component of UE, a base station, or another wireless communications device.

For another example, the communications apparatus 1000 may be UE or a base station. The transceiver unit 1005 may include a transceiver or a radio frequency chip. The transceiver unit 1005 may further include a communications interface.

Optionally, the communications apparatus 1000 may further include an antenna 1006, and the antenna 1006 may be configured to support the transceiver unit 1005 in implementing a transceiver function of the communications apparatus 1000.

Optionally, the communications apparatus 1000 may include one or more memories 1002. The memory 1002 stores a program (which may also be instructions or code) 1003, and the program 1003 may be run by the processor 1001, so that the processor 1001 performs the methods described in the foregoing method embodiments. Optionally, the memory 1002 may further store data. Optionally, the processor 1001 may further read data (for example, predefined information) stored in the memory 1002. The data and the program 1003 may be stored at a same storage address, or the data and the program 1003 may be stored at different storage addresses.

The processor 1001 and the memory 1002 may be disposed separately, or may be integrated together, for example, integrated on a board or integrated into a system on chip (SOC).

In a possible implementation, the communications apparatus 1000 is a terminal device or a chip that can be used in the terminal device. The processor 1001 may be configured to: determine uplink information; when the uplink information is first feedback information, determine a first uplink control channel resource corresponding to the first feedback information, and sending the first feedback information on the first uplink control channel resource; or when the uplink information includes A-CSI, determine a second uplink control channel resource corresponding to the uplink information, and send the uplink information on the second uplink control channel resource, where the first uplink control channel resource is different from the second uplink control channel resource. The uplink information may be sent to a network device through the transceiver unit 1005.

In a possible implementation, the communications apparatus 1000 is a network device or a chip that can be used in the network device. The transceiver unit 1005 may be configured to receive uplink information from a terminal device; and the processor 1001 may be configured to: determine an uplink control resource used by the uplink information; and when the uplink information is received on a first uplink control channel resource, determine that the uplink information is first feedback information; or when the uplink information is received on a second uplink control channel resource, determine that the uplink information includes A-CSI, where the first uplink control channel resource is different from the second uplink control channel resource.

For detailed descriptions of the operations performed by the communications apparatus 1000 in the foregoing possible embodiments, refer to the related content in the method embodiments. Details are not described.

It should be understood that steps in the foregoing method embodiments may be implemented by using a logic circuit in a hardware form or instructions in a software form in the processor 1001. The processor 1001 may be a CPU, a digital signal processor (DSP), an application-specific integrated circuit (ASIC), a field programmable gate array (FPGA), or another programmable logic device, for example, a discrete gate, a transistor logic device, or a discrete hardware component.

This application further provides a computer program product. When the computer program product is executed by the processor 1001, the communication method according to any one of the method embodiments is implemented. The computer program product includes one or more computer instructions. When the computer program instructions are loaded and executed on a computer, all or some of the procedures or the functions according to the embodiments are generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media.

The computer program product may be stored in the memory 1002. For example, the computer program product is a program 1004. After processing processes such as preprocessing, compilation, assembly, and linking, the program 1004 is finally converted into an executable target file that can be executed by the processor 1001.

This application further provides a computer-readable storage medium. The computer-readable storage medium stores a computer program. When the computer program is executed by a computer, the communication method according to any one of the method embodiments is implemented. The computer program may be a high-level language program, or may be an executable target program.

The computer-readable storage medium is, for example, the memory 1002. The memory 1002 may be a volatile memory or a nonvolatile memory, or the memory 1002 may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), and is used as an external cache. By way of example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct rambus random access memory (DR RAM).

Figure 11:
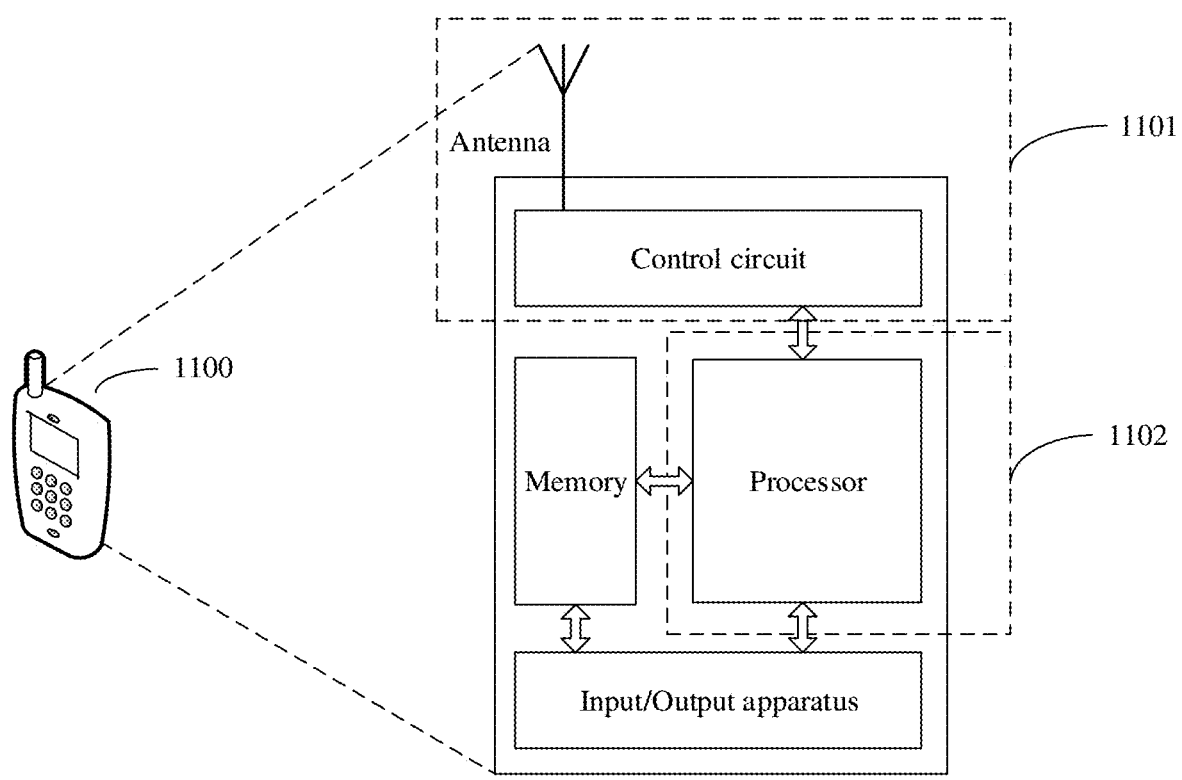
FIG. 11 is a schematic structural diagram of a terminal device 1100 according to an embodiment.

When the communications apparatus 1000 is a terminal, FIG. 11 is a schematic structural diagram of a terminal device according to this application. The terminal device 1100 may be applicable to the system shown in FIG. 1, to implement a function of the terminal device in the foregoing method embodiments. For ease of description, FIG. 11 shows only main components of the terminal device.

As shown in FIG. 11, the terminal device 1100 includes a processor, a memory, a control circuit, an antenna, and an input/output apparatus. The processor is mainly configured to: process a communication protocol and communication data, and control the entire terminal device. For example, the processor generates a first message, and then sends the first message through the control circuit and the antenna. The memory is mainly configured to store a program and data, for example, store a communication protocol and the foregoing configuration information. The control circuit is mainly configured to: perform conversion between a baseband signal and a radio frequency signal, and process the radio frequency signal. A combination of the control circuit and the antenna may also be referred to as a transceiver that is mainly configured to receive/send a radio frequency signal in an electromagnetic wave form. The input/output apparatus is, for example, a touchscreen, a display screen, or a keyboard, and is mainly configured to receive data entered by a user and output data to the user.

After the terminal device is powered on, the processor may read a program in the memory, interpret and execute an instruction included in the program, and process data in the program. When information needs to be sent through the antenna, the processor performs baseband processing on the to-be-sent information, and outputs a baseband signal to a radio frequency circuit. The radio frequency circuit performs radio frequency processing on the baseband signal to obtain a radio frequency signal, and sends the radio frequency signal in an electromagnetic wave form through the antenna. When an electromagnetic wave (namely, the radio frequency signal) that carries information arrives at the terminal, the radio frequency circuit receives the radio frequency signal through the antenna, converts the radio frequency signal into the baseband signal, and outputs the baseband signal to the processor. The processor converts the baseband signal into the information, and processes the information.

A person skilled in the art may understand that for ease of description, FIG. 11 shows only one memory and one processor. In an actual terminal device, there may be a plurality of processors and a plurality of memories. The memory may also be referred to as a storage medium, a storage device, or the like. This is not limited in this application.

In an optional implementation, the processor in FIG. 11 may integrate functions of the baseband processor and the CPU. A person skilled in the art may understand that the baseband processor and the CPU may alternatively be respectively independent processors, and are interconnected by using technologies such as a bus. A person skilled in the art may understand that the terminal device may include a plurality of baseband processors to adapt to different network standards, the terminal device may include a plurality of CPUs to improve a processing capability of the terminal device, and the components of the terminal device may be connected by using various buses. The baseband processor may also be referred to as a baseband processing circuit or a baseband processing chip. The CPU may also be referred to as a central processing circuit or a central processing chip. A function of processing the communication protocol and the communication data may be embedded into the processor, or may be stored in the memory in a form of a program, so that the processor executes the program in the memory to implement a baseband processing function.

In this application, the antenna and the control circuit that have sending and receiving functions may be considered as a transceiver unit 1101 of the terminal device 1100. The transceiver unit 1101 is configured to support the terminal device in implementing the receiving function in the method embodiments, or is configured to support the terminal device in implementing the sending function in the method embodiments. The processor having a processing function is considered as a processing unit 1102 of the terminal device 1100. As shown in FIG. 11, the terminal device 1100 includes the transceiver unit 1101 and the processing unit 1102. The transceiver unit may also be referred to as a transceiver machine, a transceiver, a transceiver apparatus, or the like. Optionally, a device configured to implement the receiving function in the transceiver unit 1101 may be considered as a receiving unit. A device configured to implement the sending function in the transceiver unit 1101 may be considered as a sending unit. In other words, the transceiver unit 1101 includes the receiving unit and the sending unit. The receiving unit may also be referred to as a receiver, an input port, a receiving circuit, or the like. The sending unit may be referred to as a transmitter, a transmitter machine, a transmitting circuit, or the like.

The processor 1102 may be configured to execute a program stored in the memory, to control the transceiver unit 1101 to receive a signal and/or send a signal, to complete a function of the terminal device in the foregoing method embodiments. In an implementation, a function of the transceiver unit 1101 may be implemented through a transceiver circuit or a transceiver-dedicated chip.

The processor 1102 may perform a function of the processing unit 901 in the communications apparatus 900 shown in FIG. 9 or a function of the processor 1001 in the communications apparatus 1000 shown in FIG. 10. The transceiver unit 1101 may perform a function of the transceiver unit 902 in the communications apparatus 900 shown in FIG. 9 or a function of the transceiver unit 1005 in the communications apparatus 1000 shown in FIG. 10. Details are not described.

Figure 12:
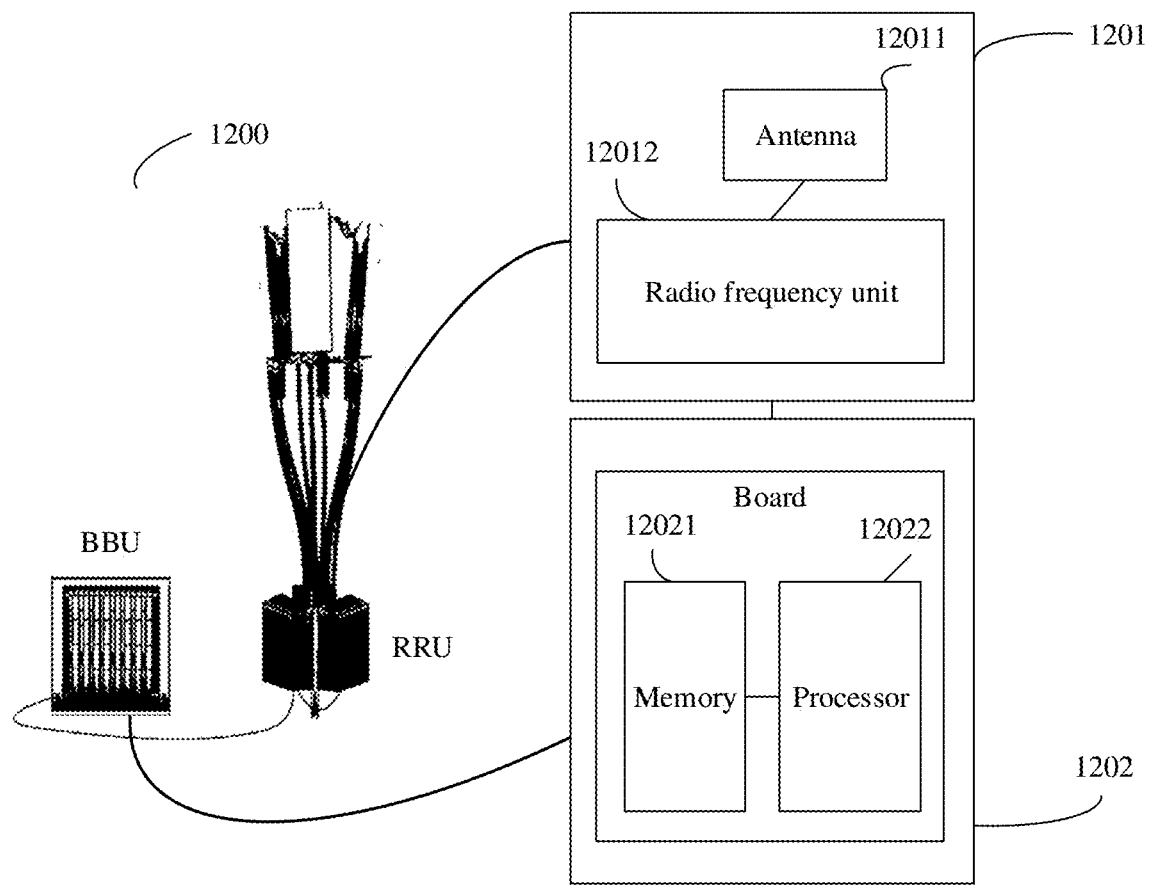
FIG. 12 is a schematic structural diagram of a network device 1200 according to an embodiment.

When the communications apparatus 1000 is an access network device, FIG. 12 is a schematic structural diagram of a network device according to this application. The network device may be, for example, a base station. As shown in FIG. 12, the base station may be applied to the system shown in FIG. 1, to implement a function of the network device in the foregoing method embodiments. The base station 1200 may include one or more radio frequency units, for example, a remote radio unit (RRU) 1201 and at least one baseband unit (BBU) 1202. The BBU 1202 may include a distributed unit (DU), or may include a DU and a central unit (CU).

The RRU 1201 may be referred to as a transceiver unit, a transceiver, a transceiver circuit, or a transceiver machine, and may include at least one antenna 12011 and a radio frequency unit 12012. The RRU 1201 is mainly configured to perform receiving and sending of a radio frequency signal and conversion between a radio frequency signal and a baseband signal, for example, configured to support the base station in implementing a sending function and a receiving function in the method embodiments. The BBU 1202 is mainly configured to perform baseband processing, control the base station, and the like. The RRU 1201 and the BBU 1202 may be physically disposed together, or may be physically separated, namely, a distributed base station.

The BBU 1202 may also be referred to as a processing unit, and is mainly configured to complete baseband processing functions such as channel coding, multiplexing, modulation, and spectrum spreading. For example, the BBU 1202 may be configured to control the base station to perform an operation procedure related to the network device in the foregoing method embodiments.

The BBU 1202 may include one or more boards. A plurality of boards may jointly support a radio access network (for example, a 5G network) of a single access standard, or may separately support radio access networks (for example, an LTE network and a 5G network) of different access standards. The BBU 1202 further includes a memory 12021 and a processor 12022. The memory 12021 is configured to store instructions and data. For example, the memory 12021 stores various information in the foregoing method embodiments. The processor 12022 is configured to control the base station to perform a action, for example, is configured to control the base station to perform the operation procedure in the foregoing method embodiments. The memory 12021 and the processor 12022 may serve one or more boards. In other words, a memory and a processor may be disposed on each board. Alternatively, a plurality of boards may share a same memory and a same processor. In addition, each board may further be provided with a circuit.

The BBU 1202 may perform a function of the processing unit 901 in the communications apparatus 900 shown in FIG. 9 or a function of the processor 1001 in the communications apparatus 1000 shown in FIG. 10. The RRU 1201 may perform a function of the transceiver unit 902 in the communications apparatus 900 shown in FIG. 9 or a function of the transceiver unit 1005 in the communications apparatus 1000 shown in FIG. 10. Details are not described.

This application further provides a communications system, including the terminal device 1100 and the base station 1200. For functions of the devices, refer to descriptions in other embodiments. Details are not described.

A person skilled in the art may be clearly aware that, the descriptions of the embodiments provided in this application may be referred to each other. For convenience and conciseness, for example, for functions of the apparatuses and devices provided in the embodiments and the performed steps, refer to related descriptions of the method embodiments. The method embodiments and the apparatus embodiments may also be referred to each other or combined with each other.

In the several embodiments provided in this application, the disclosed system, apparatus and method may be implemented in another manner. For example, some features of the method embodiments described above may be ignored or not performed. The described apparatus embodiments are merely examples. For example, the division into units is merely logical function division and may be other division during actual implementation. For example, a plurality of units or components may be combined or integrated into another system. In addition, a coupling between the units or a coupling between the components may be a direct coupling, or may be an indirect coupling. The foregoing coupling includes an electrical connection, a mechanical connection, or a connection in another form.

It needs to be understood that sequence indexes of the foregoing processes do not mean execution sequences in the various embodiments. The execution sequences of the processes need to be determined based on functions and internal logic of the processes, and do not need to be construed as any limitation on the implementation processes of the embodiments. In addition, in the embodiments, the terminal device and/or the network device may perform some or all steps in the embodiments. These steps or operations are merely examples. In the embodiments, other operations or variations of various operations may be further performed. In addition, the steps may be performed in a sequence different from that presented in the embodiments, and not all the operations in the embodiments are necessarily performed.

What is claimed is:

1. A communication method used for a terminal, comprising:
   determining uplink information; and
   when the uplink information is first feedback information, determining a first uplink control channel resource corresponding to the first feedback information, and sending the first feedback information on the first uplink control channel resource; or
      when the uplink information comprises aperiodic channel state information (A-CSI), determining a second uplink control channel resource corresponding to the uplink information, and sending the uplink information on the second uplink control channel resource,
   receiving first indication information, wherein the first indication information is used to indicate a first group of uplink control channel resource sets, and the first group of uplink control channel resource sets comprises at least one uplink control channel resource set; and
   receiving second indication information, wherein the second indication information is used to indicate a second group of uplink control channel resource sets, and the second group of uplink control channel resource sets comprises at least one uplink control channel resource set,
   wherein
   the first uplink control channel resource is different from the second uplink control channel resource;
   the at least one uplink control channel resource set in the first group of uplink control channel resource sets is different from the at least one uplink control channel resource set in the second group of uplink control channel resource sets;
   the first uplink control channel resource belongs to a third uplink control channel resource set, the third uplink control channel resource set belongs to the first group of uplink control channel resource sets, and there is a first mapping relationship between the third uplink control channel resource set and an information payload of the first feedback information; and
   the second uplink control channel resource belongs to a fourth uplink control channel resource set, the fourth uplink control channel resource set belongs to the first group of uplink control channel resource sets or the second group of uplink control channel resource sets, and there is a second mapping relationship between the fourth uplink control channel resource set and a sum of an information payload of the A-CSI and an information payload of the feedback information sent on the second uplink control channel resource, wherein
   the first mapping relationship is different from the second mapping relationship.

2. The method according to claim 1, wherein
   the uplink information comprises the A-CSI and second feedback information; and
   the sending the uplink information on the second uplink control channel resource comprises:
   sending the A-CSI and the second feedback information on the second uplink control channel resource.

3. The method according to claim 1, wherein
   the first uplink control channel resource belongs to a first uplink control channel resource set, and the first uplink control channel resource set belongs to the first group of uplink control channel resource sets; and
   the second uplink control channel resource belongs to a second uplink control channel resource set, and the second uplink control channel resource set belongs to the second group of uplink control channel resource sets, wherein
   the first uplink control channel resource set is different from the second uplink control channel resource set.

4. The method according to claim 1, wherein when the fourth uplink control channel resource set belongs to the first group of uplink control channel resource sets, an information payload range corresponding to the fourth uplink control channel resource set is the smallest one of one or more information payload ranges larger than an information payload range corresponding to the third uplink control channel resource set.

5. The method according to claim 1, wherein
   the determining the first uplink control channel resource corresponding to the uplink information comprises:
   determining the first uplink control channel resource based on first resource indication information; and
   the determining the second uplink control channel resource corresponding to the uplink information comprises:
   determining the second uplink control channel resource based on second resource indication information, wherein
   the first resource indication information and the second resource indication information are comprised in two pieces of different downlink control information (DCI).

6. The method according to claim 5, wherein the two pieces of different DCI comprise first DCI and second DCI;
   the second resource indication information is comprised in the first DCI, and the first DCI corresponds to the A-CSI; and
   the first resource indication information is comprised in the second DCI, the second DCI is the $N^{th}$ piece of DCI that is received in a time sequence and that corresponds to the first feedback information, the first feedback information corresponds to N pieces of DCI, and N is a positive integer.

7. A communications apparatus, comprising a processor coupled to a memory; and
   a transceiver, configured to receive first indication information and second indication information;
   wherein the processor executes instructions stored in the memory to enable the communications apparatus to perform:

determining uplink information; and when the uplink information is first feedback information, determining a first uplink control channel resource corresponding to the first feedback information, and sending the first feedback information on the first uplink control channel resource; or when the uplink information comprises aperiodic channel state information (A-CSI), determining a second uplink control channel resource corresponding to the uplink information, and sending the uplink information on the second uplink control channel resource, wherein the first uplink control channel resource is different from the second uplink control channel resource;

wherein the first indication information is used to indicate a first group of uplink control channel resource sets, and the first group of uplink control channel resource sets comprises at least one uplink control channel resource set and the second indication information is used to indicate a second group of uplink control channel resource sets, and the second group of uplink control channel resource sets comprises at least one uplink control channel resource set, wherein the at least one uplink control channel resource set in the first group of uplink control channel resource sets is different from the at least one uplink control channel resource set in the second group of uplink control channel resource sets;

the first uplink control channel resource belongs to a third uplink control channel resource set, the third uplink control channel resource set belongs to the first group of uplink control channel resource sets, and there is a first mapping relationship between the third uplink control channel resource set and an information payload of the first feedback information; and the second uplink control channel resource belongs to a fourth uplink control channel resource set, the fourth uplink control channel resource set belongs to the first group of uplink control channel resource sets or the second group of uplink control channel resource sets, and there is a second mapping relationship between the fourth uplink control channel resource set and a sum of an information payload of the A-CSI and an information payload of the feedback information sent on the second uplink control channel resource, wherein the first mapping relationship is different from the second mapping relationship.

8. The apparatus according to claim 7, wherein the uplink information comprises the A-CSI and second feedback information; and the sending the uplink information on the second uplink control channel resource comprises:

sending the A-CSI and the second feedback information on the second uplink control channel resource.

9. The apparatus according to claim 7, wherein the first uplink control channel resource belongs to a first uplink control channel resource set, and the first uplink control channel resource set belongs to the first group of uplink control channel resource sets; and the second uplink control channel resource belongs to a second uplink control channel resource set, and the second uplink control channel resource set belongs to the second group of uplink control channel resource sets, wherein the first uplink control channel resource set is different from the second uplink control channel resource set.

10. The apparatus according to claim 7, wherein when the fourth uplink control channel resource set belongs to the first group of uplink control channel resource sets, an information payload range corresponding to the fourth uplink control channel resource set is the smallest one of one or more information payload ranges larger than an information payload range corresponding to the third uplink control channel resource set.

11. The apparatus according to claim 7, wherein the processor is configured to:

determine the first uplink control channel resource based on first resource indication information; and determine the second uplink control channel resource based on second resource indication information, wherein the first resource indication information and the second resource indication information are comprised in two pieces of different downlink control information (DCI).

12. The apparatus according to claim 11, wherein the two pieces of different DCI comprise first DCI and second DCI;

the second resource indication information is comprised in the first DCI, and the first DCI corresponds to the A-CSI; and the first resource indication information is comprised in the second DCI, the second DCI is the $N^{th}$ piece of DCI that is received in a time sequence and that corresponds to the first feedback information, the first feedback information corresponds to N pieces of DCI, and N is a positive integer.

13. A communications apparatus, comprising a processor coupled to a memory; and a transceiver, configured to send first indication information and second indication information to the terminal device, wherein wherein the processor is configured to execute instructions stored in the memory to enable the communications apparatus to perform:

determining an uplink control resource used by uplink information sent by a terminal device;

when the uplink information is received on a first uplink control channel resource, determining that the uplink information is first feedback information; or when the uplink information is received on a second uplink control channel resource, determining that the uplink information comprises aperiodic channel state information (A-CSI), wherein the first uplink control channel resource is different from the second uplink control channel resource; and receiving the uplink information wherein, the first indication information is used to indicate a first group of uplink control channel resource sets, and the first group of uplink control channel resource sets comprises at least one uplink control channel resource set and the second indication information is used to indicate a second group of uplink control channel resource sets, and the second group of uplink control channel resource sets comprises at least one uplink control channel resource set, wherein the at least one uplink control channel resource set in the first group of uplink control channel resource sets is different from the at least one uplink control channel resource set in the second group of uplink control channel resource sets, the first uplink control channel resource belongs to a third uplink control channel resource set, the third uplink control channel resource set belongs to the first group of uplink control channel resource sets, and there is a first mapping relationship between the third uplink control channel resource set and an information payload of the first feedback information; and the second uplink control channel resource belongs to a fourth uplink control channel resource set, the fourth uplink control channel resource set belongs to the first group of uplink control channel resource sets or the second group of uplink control channel resource sets, and there is a second mapping relationship between the fourth uplink control channel resource set and a sum of an information payload of the A-CSI and an information payload of the feedback information sent on the second uplink control channel resource, wherein the first mapping relationship is different from the second mapping relationship.

14. The apparatus according to claim 13, wherein when the uplink information is received on the second uplink control channel resource, the uplink information comprises the A-CSI and second feedback information.

15. The apparatus according to claim 13, the first resource indication information is used to determine the first uplink control channel resource, and the second resource indication information is used to determine the second uplink control channel resource; and the first resource indication information and the second resource indication information are comprised in two pieces of different downlink control information (DCI).

* * * * *